United States Patent [19]
Klein et al.

[11] Patent Number: 5,305,398
[45] Date of Patent: Apr. 19, 1994

[54] METHOD AND APPARATUS FOR SCALING IMAGE DATA

[75] Inventors: Robert Klein, Farmington; Audrey A. Brennan, Northville; Kevin Jennings, Farmington Hills, all of Mich.

[73] Assignee: Unisys Corporation, Blue Bell, Pa.

[21] Appl. No.: 420,779

[22] Filed: Oct. 10, 1989

[51] Int. Cl.$^5$ .............................................. G06K 9/42
[52] U.S. Cl. .................................. 382/47; 382/56
[58] Field of Search ........................ 382/47, 56, 27; 340/731; 358/433

[56] References Cited

U.S. PATENT DOCUMENTS

| | | | |
|---|---|---|---|
| 3,652,791 | 3/1972 | Shuey | 178/71 R |
| 4,087,788 | 5/1978 | Johannesson | 382/21 |
| 4,091,424 | 5/1978 | Widergren | 358/260 |
| 4,288,816 | 9/1981 | Kashioka et al. | 382/56 |
| 4,363,036 | 12/1982 | Subramaniam | 358/261.2 |
| 4,399,467 | 8/1983 | Subramaniam | 358/261.3 |
| 4,410,965 | 10/1983 | Moore | 365/189.05 |
| 4,412,252 | 10/1983 | Moore et al. | 365/189.05 |
| 4,510,618 | 4/1985 | Ataman et al. | 382/21 |
| 4,510,619 | 4/1985 | LeBrun et al. | 382/21 |
| 4,613,986 | 9/1986 | Ataman et al. | 382/21 |
| 4,672,186 | 6/1987 | Van Tyne | 382/1 |
| 4,885,786 | 12/1989 | Anderson et al. | 382/47 |
| 4,907,152 | 3/1990 | Lempriere | 382/47 |
| 4,933,775 | 6/1990 | Shimura | 358/451 |

FOREIGN PATENT DOCUMENTS

| | | |
|---|---|---|
| 0033623 | 8/1981 | European Pat. Off. |
| 0105707 | 4/1984 | European Pat. Off. |
| 2633747 | 1/1990 | France |
| 2177567A | 1/1987 | United Kingdom |
| 2214038A | 8/1989 | United Kingdom |

OTHER PUBLICATIONS

Some Extensions of the Ordering Techniques for Compression of Two-Level Facsimile Pictures, F. W. Mounts, A. N. Netravali & K. A. Walsh 1978 A T & T Company The Bell System Technical Journal pp. 3057–3067.

Twodimensional Facsimile Source Encoding Based on a Markov Model by Dieter Preus NTZ-Aufsatze pp. 358–363 (1975).

Ordering Techniques for Coding of Two-Tone Facsimile Pictures by A. N. Netravali, F. W. Mounts & E. G. Bowen 1976 A T & T Company-The Bell System Technical Journal pp. 1539–1553.

Patent Abstract of Japan–vol. 12, No. 207 (E–621) Jun. 1988.

*Primary Examiner*—Leo H. Boudreau
*Attorney, Agent, or Firm*—Harness, Dickey & Pierce

[57] ABSTRACT

An application specific integrated circuit (ASIC) provides sufficient information about the size of the image, as well as pixel data, to permit a scaling processor to change the size of the image for further processing.

18 Claims, 13 Drawing Sheets

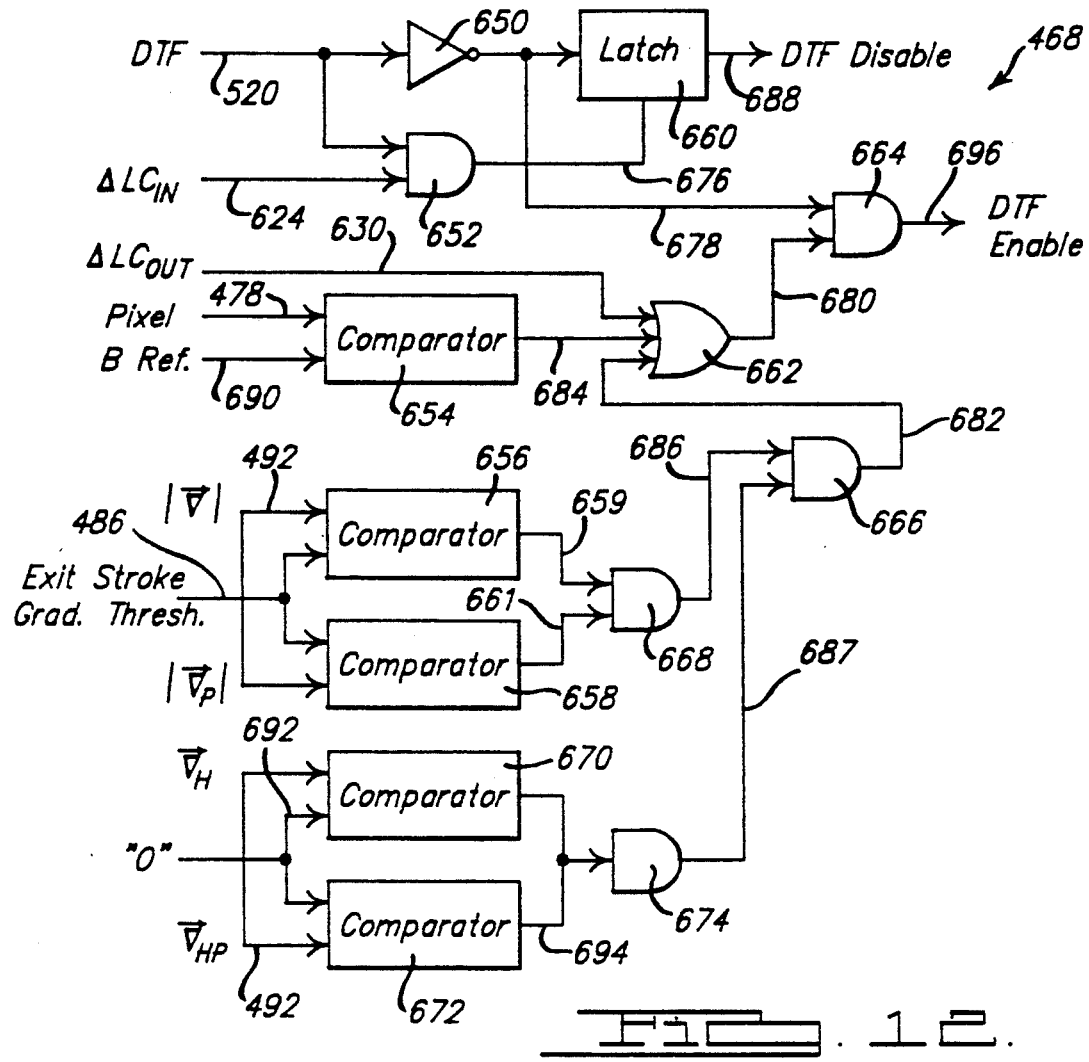
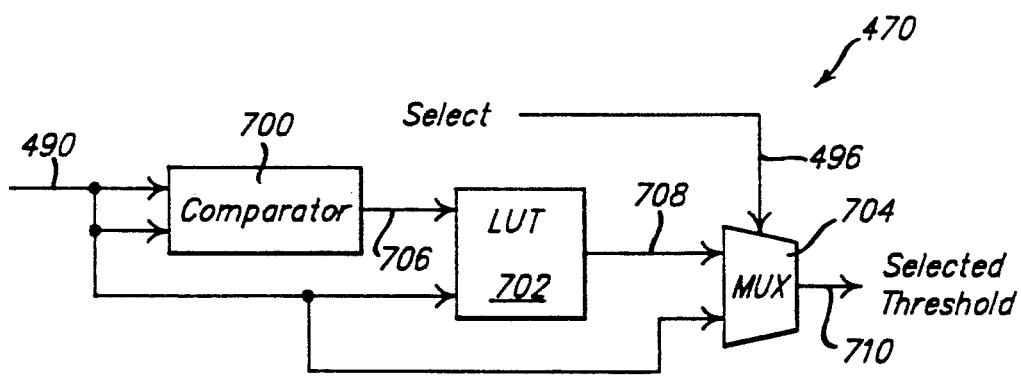

METHOD AND APPARATUS FOR SCALING IMAGE DATA

CROSS REFERENCE TO RELATED APPLICATIONS

This application is related to the following applications, which were filed of even date herewith and are assigned to the same assignee as this application:

PARALLEL PIPELINED IMAGE PROCESSOR—Capo et al., U.S. Ser. No. 092,555, filed Oct. 10, 1989, now abandoned in favor of continuation U.S. Ser. No. 931,651, filed Aug. 17, 1992;

IMAGE DATA PROCESSOR—Klein et al., U.S. Ser. No. 419,270, filed Oct. 10, 1989, now U.S. Pat. No. 5,140,444, issued Aug. 18, 1992;

METHOD AND APPARATUS FOR EFFECTING BACKGROUND SUPPRESSION OF IMAGE DATA—Klein et al., U.S. Ser. No. 419,594, filed Oct. 10, 1989, now U.S. Pat. No. 5,093,871, issued Mar. 3, 1992;

METHOD AND APPARATUS FOR EFFECTING SPOT/VOID FILTERING OF IMAGE DATA—Klein et al., U.S. Ser. No. 419,595, filed Oct. 10, 1989, now U.S. Pat. No. 5,029,226, issued Jul. 2, 1991;

METHOD AND APPARATUS FOR DETECTING DOCUMENT SIZE IN AN IMAGING SYSTEM—D'Aoust et al., U.S. Ser. No. 419,530, filed Oct. 10, 1989, now U.S. Pat. No. 5,020,124, issued May 28, 1991;

APPARATUS FOR IMAGE DATA TRANSPOSITION AND COMPRESSION/DECOMPRESSION—Klein et al., U.S. Ser. No. 419,253, filed Oct. 10, 1989, now U.S. Pat. No. 5,055,919, issued Oct. 8, 1991;

METHOD AND APPARATUS FOR TRANSPOSING IMAGE DATA—D'Aoust et al., U.S. Ser. No. 419,778, filed Oct. 10, 1989, now U.S. Pat. No. 5,048,104, issued Sep. 10, 1991;

METHOD AND APPARATUS FOR LOSSLESS COMPRESSION AND DECOMPRESSION OF IMAGE DATA—Klein et al., U.S. Ser. No. 419,611, filed Oct. 10, 1989, now U.S. Pat. No. 5,095,374, issued Mar. 10, 1992;

DIAGNOSTIC SYSTEM FOR A PARALLEL PIPELINED IMAGE PROCESSING SYSTEM—D'Aoust et al., U.S. Ser. No. 419,606, filed Oct. 10, 1989, now U.S. Pat. No. 5,007,100, issued Apr. 8, 1991.

BACKGROUND OF THE INVENTION

1. Field of the Invention

This invention relates to the processing of video image data and, more particularly, to a method and apparatus for the processing of video image data associated with a document imaging system.

2. Discussion

Financial documents, such as check or drafts, usually contain a plurality of characters printed in magnetic ink which are typically read by a sorter which automatically sorts these documents into a plurality of bins. Prior to sorting, these documents are physically handled by a plurality of individuals, each of who enters the dollar amount associated therewith upon the document by the use of specialized amount entry equipment. Additionally, these individuals physically enter any corrections, associated with the reading of the magnetic code, upon each of the sorted documents.

These prior techniques of utilizing a plurality of individuals to process financial documents, in the aforementioned manner has proven to be relatively costly and inefficient in that many of these documents have been lost or destroyed during their physical handling by these individuals. The speed associated with the processing of the documents is also limited to the processing capabilities of the individuals and the particular mechanical amount entry equipment used by them.

SUMMARY OF THE INVENTION

In accordance with the teachings of the present invention, an image processing device is provided for use with an array of pixels arranged in rows and columns. The device includes inputs for receiving the pixel data as well as a signal indicating an end of a scan line of the image sensor which generated pixel data An address generator provides an address for each pixel in a scan line so that it can be stored in locations in a memory and, accordingly, the addresses provide information about the number of rows in the image. A counter counts the number of end of scan line signals and provides information about the number of columns in the image. The device provides an output containing information about the number of scan lines, number of generated addresses and the pixel data. This information is especially adapted for use with a scaling processor. Since, the number of scan lines and number of generated addresses are a function of the size of the original image, this data may be used to scale down the size of the original image in order to increase resolution.

BRIEF DESCRIPTION OF THE DRAWINGS

For a more complete understanding of the present invention, relative to the advantages thereof, reference may be made to the following detailed description taken in conjunction with the accompanying drawings in which:

FIG. 12 is a block diagram of the thresholding enabler shown generally in FIG. 8;

FIG. 13 is a block diagram of the threshold selector shown generally in FIG. 8;

DETAILED DESCRIPTION

1. Document System Overview

Figure 1:
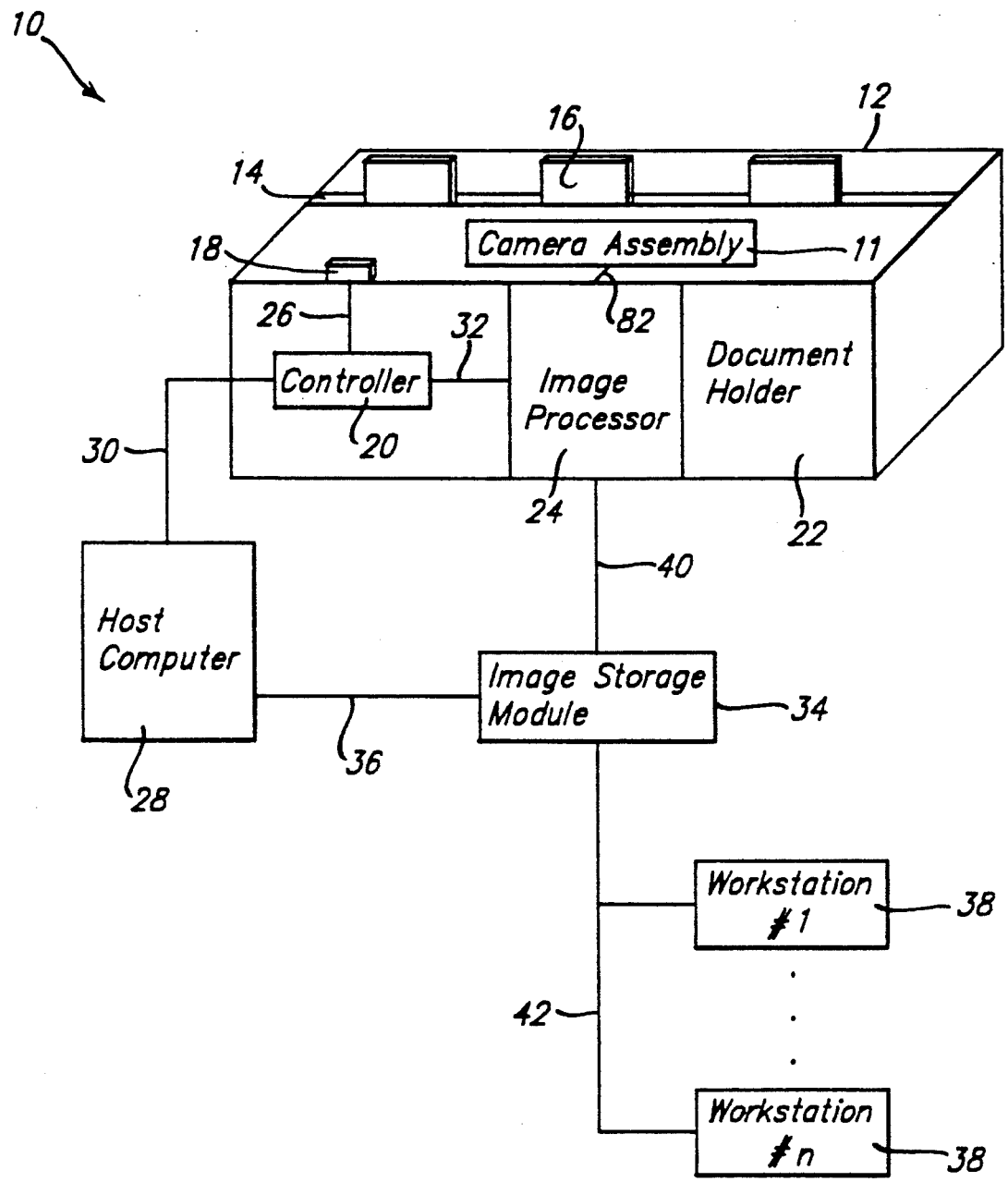
FIG. 1 is a block diagram of a typical financial document sorting system, containing image processing apparatus made in accordance with the teachings of this invention.

Referring now to FIG. 1, there is shown a financial document sorting system 10 having a typical document sorter 12 which, in the preferred embodiment of this invention, is a model DP1800 sorter which is manufactured by the Unisys Corporation of Blue Bell, Pa.

Sorter 12 contains a track 14 into which a plurality of financial documents 16 traverse through and reside within, and further contains a typical magnetic character reader 18 and a typical magnetic character reader controller 20. Additionally, sorter 12 contains a document holder 22, a camera assembly 11, and the image processor 24 made in accordance with the teachings of the preferred embodiment of this invention.

Controller 20 is coupled to the reader 18 by signals on the bus 26, to a host computer 28 by signals on the bus 30, and to the image processor 24 by signals on the bus 82. The computer 28 is coupled to an image storage module 34 by signals on the bus 36 and the image storage module 34 is also coupled to the image processor 24 and to a plurality of workstations 38 by signals on the busses 40 and 42 respectively. Additionally, camera system 11 is coupled to the image processor 24 by signals on bus 32.

In operation, documents 16 sequentially traverse in close proximity to reader 18 which reads a typical magnetic code appearing upon each of the documents 16. This code is then sent to the computer 28, by signals on the bus 30, for storage therein and to the image processor 24, by signals on the bus 32. As each of the documents 16 further travels within the track 14, they pass in close proximity to the camera system 11 which captures the image of the document 16 and outputs a digital representation of the image on bus 82 to the image processor 24. This digital representation comprises a plurality of image pixels having an intensity represented by a number between 0 and 255. Image processor 24 then processes this digitized image thereof and sends this processed image, by signals on the bus 40, to the image storage module 34 for storage therein. After passing by the image processor 24, each of the documents are then sorted, by sorter 10, in the usual way and are held within the document holder 22.

After a typical block of the documents 16 have been sorted in the aforementioned manner, the workstations 38, by signals on the bus 42 sequentially requests the aforementioned document images from the storage module 34. These images are then downloaded to the workstations 38, by use of signals on the bus 42, along with their associated magnetic code data obtained from host computer 28.

After these images are captured by the workstations 38, individual operators electronically enter the dollar amount associated with each document and electronically resolve any difficulties associated with the reading of the magnetic code thereon by entering and storing the needed corrections for each document image. Each digitized image and its dollar amount and associated corrections then form a single computerized record which is then sent to the storage module 34, by use of signals on the bus 42, where it may be later accessed for use in automatically placing the dollar amount and corrections upon the sorted documents 16. Therefore the aforementioned document sorting system 10 substantially eliminates the physical handling of the plurality of documents 16 when the associated dollar amount is placed thereon thereby increasing the efficiency and timeliness of the overall document sorting system 10.

Figure 2:
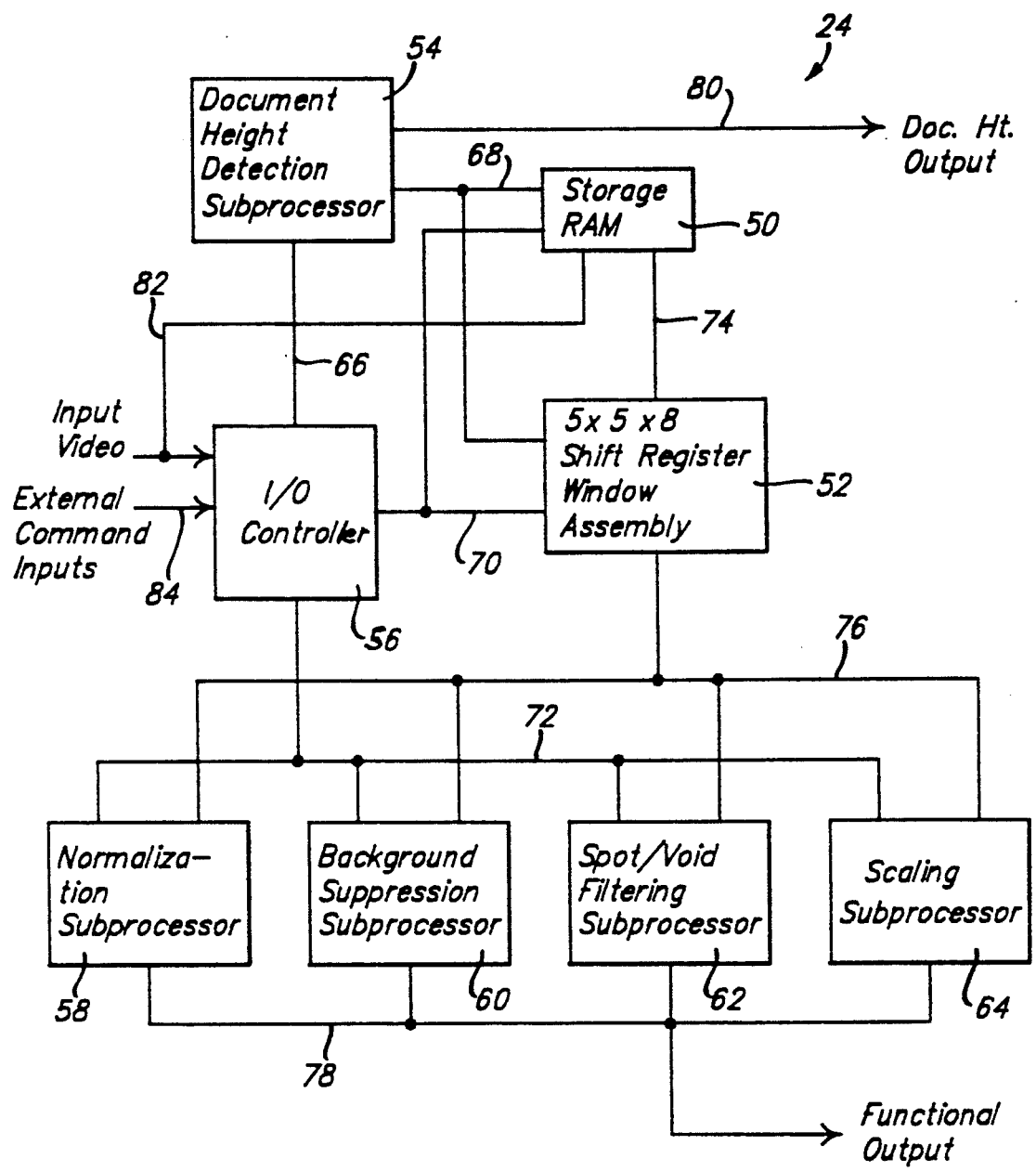
FIG. 2 is a block diagram of the image processing apparatus of the preferred embodiment of this invention.

Referring now to FIG. 2, there is shown image processor 24 arranged in accordance with the principles of the preferred embodiment of this invention, and including a random access storage memory (RAM) 50, a 5×5×8 bit shift register window assembly 52, a document height detection subprocessor 54, an input/output controller, a normalization subprocessor 58, a background suppression subprocessor 60, a spot/void subprocessor 62, and a scaling subprocessor 64.

Specifically, the document height detection subprocessor 54 is coupled to the input/output controller 56 by signals on bus 66 and is further coupled to the storage RAM 50 and to window shift register window assembly by signals on bus 68. The input/output controller is coupled to the storage RAM 50 and to the shift window assembly 52 by signals on bus 70 while also being coupled to the subprocessors 58, 60, 62, and 64 by signals on bus 72.

The shift register window assembly is additionally coupled to storage RAM 50 by signals on bus 74 and is coupled to each of the subprocessors 58, 60, 62, and 64 by signals on bus 76. Additionally, the subprocessors 58, 60, 62, and 64 are coupled together by signals on bus 78 which represents a functional output associated therewith, while the document height detection subprocessor 54 produces a document height output on bus 80.

Input video data is coupled to the storage RAM 50 and to the input/output controller by signals on bus 82 while the input/output controller further has an input bus 84 which is coupled thereto and which contains externally placed parameter data and command inputs which may emanate from host computer 28 through busses 30 and 32 (FIG. 1).

Generally, the normalization subprocessor 58 is used to correct image data defects associated with such things as a non-uniform photo-cell responsiveness of the camera system 11 or non-uniform document illumination across a segment of a document being scanned during the acquisition of input video data which is placed upon bus 82 by system 11.

The background suppression subprocessor 60 is used to eliminate unwanted scenic or patterned background information from the image of a scanned document, while retaining printed and written information with the image associated with signals on the bus 82. The background suppression subprocessor 60 provides for uniform background, increased image contrast, and increased image uniformity associated with the video data placed upon bus 82. The spot/void filtering subprocessor 62 is used to eliminate small white and dark anomalies which adversely affect the quality and compressibility of the image represented by signals on the bus 82, while the scaling subprocessor 64 allows the image to be scaled relative to the resolution of the image by using one of a plurality of algorithms. The document height detection preprocessor 64 finds the highest and lowest points of transition from the image of the document to the image of the background thusly finding or identifying the overall height of the document whose image is represented by signals on bus 82.

The input/output controller is used to receive externally placed commands and parameter data associated with the processing of the preprocessors 58, 66, 62, and 64 and is further used in the normalization function to allow a remotely located controller (i.e. host computer 28) to sample the input video signals upon the bus 82. The input/output controller, by means of signals on bus 72, selects one of the subprocessors 58, 60, 62, or 64 to be activated in response to external command inputs upon bus 84.

The shift register window assembly 52 is used as a repository for image pixel data and is used in the performance of the various functions associated with subprocessors 58, 60, 62, or 64. In the preferred embodiment of this invention, shift register window assembly 52 has a dimension of 5×5×8 bits, since each of the pixels associated with the video image upon the bus 82 is up to eight bits in length, and since the operations associated with the subprocessors 58, 60, 62, and 64 are performed upon a 5×5 pixel array.

2. Storage RAM and Pixel Window Assembly

Figure 3:
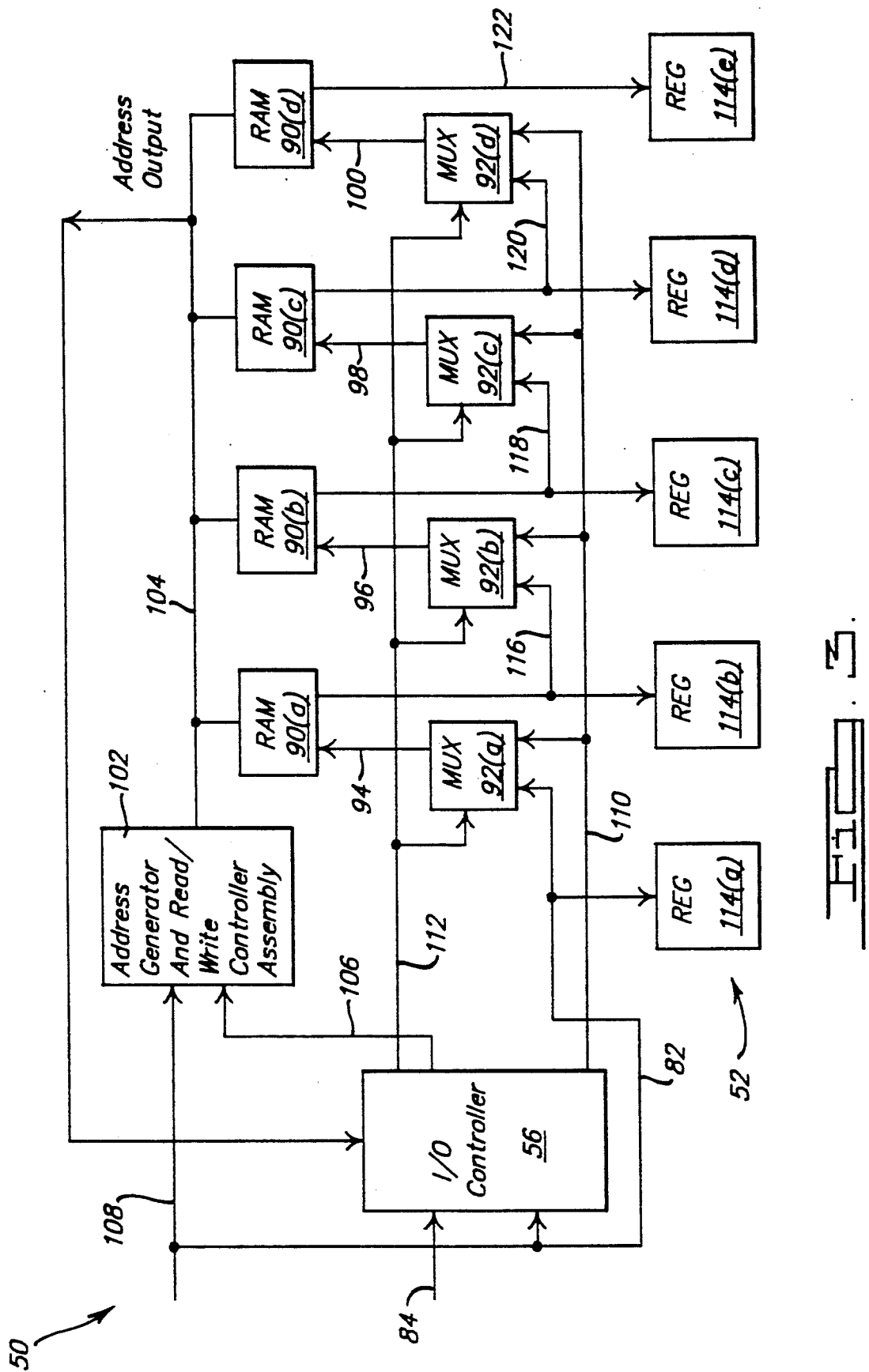
FIG. 3 is a block diagram of the storage RAM and window shift register shown generally in FIG. 2.

Referring now to FIG. 3 there is shown further details of the storage RAM 50 and the shift register window assembly 52 of FIG. 2. Specifically, the storage RAM 50 contains a plurality of random access memory units 90(a-d), each of which contain a storage capacity of approximately one column of image data, each column having 532 addressable storage locations therein. Each of the column storage locations is capable of storing eight bits of data therein.

Each of the random access memory units 90(a-d) is coupled to an associated multiplexer 92(a-d) by signals on buses 94, 96, 98, and 100, respectively. Additionally, the storage RAM 50 contains an address generator and read/write controller assembly 102 which is coupled to random access memory units 90(a-d) by signals on bus 104 and to the input/output controller by signals on bus 106. Controller 56 places typical write enabling signals on bus 106 to controller 102. Address generator and read/write controller assembly is coupled to an end-of-scan input signal 108 from camera system 11 by signals on bus 82 and its use will hereinlater be explained.

Further, each of the multiplexers 92(a-d) is coupled to input/output controller 56 by signals on bus 110, which provides a multiplexer enablement or selection signal, and each of the multiplexers 90(a-d) are further coupled at another input associated therewith to the input/output controller 56 by signals on bus 112.

Shift window register assembly 52 contains a plurality of registers 114(a-e). Specifically, register 114(a) is coupled to the video input represented by signals on bus 82, and the register 114(b) is coupled to memory 90(a) and to multiplexer 92(b) by signals on bus 116. Register 114(c) is coupled to memory 92(b) and to multiplexer 92(c) by signals on bus 118, while the register 114(d) is coupled to memory 90(c) and to multiplexer 92(d) by signals on bus 120. Register 114(e) is coupled to memory 90(d) by signals on bus 122. Video data, present on bus 82, is also coupled to an input of multiplexer 92(a).

In operation, video data on bus 82 is initially input into multiplexer 92(a) (along with image processing data, on bus 110, which were originally input to the input/output controller by signals on the bus 84 of FIG. 2) Multiplexer 92(a) is then directed by the input/output controller 56, by means of signals on bus 112, to output either the video data that is present upon the bus 82 or the image processing data appearing upon the bus 110 to the memory 90(a) by signals on bus 94. The data represented by the signals on bus 94 is then input into memory 90(a) and is subsequently output therefrom to register 114(b) and to the multiplexer 92(b) by signals on bus 116. Additionally, the video data associated with bus 82 is initially input into the register 114(a) thereby.

The input/output controller 56 then sends additional image processing data to multiplexer 92(b) by signals on bus 110 and directs multiplexer 92(b) to output either signals on bus 116 or signals on bus 110 to memory 90(b) by use of control signals on bus 112. This output data from the multiplexer 92(b) is then output upon bus 96. The data stored within the memory 90(b) is then output to register 114(c) by signals on bus 118 and is further input into the multiplexer 92(c). The input/output controller 56 also sends control inputs to the multiplexer 92(c) by signals on bus 110 and, as before, directs the multiplexer 92(c), by signals on bus 112, to output either signals on bus 110 or signals on bus 118 therefrom and which ultimately appear on the bus 98.

Signal data upon bus 98 is input into memory 90(c) where it is subsequently output to register 114(d) by signals on bus 120 and to multiplexer 92(d) upon the same bus 120. The input/output controller 56 then transmits additional control data to multiplexer 92(d) by signals on bus 112 and this control data will cause multiplexer 92(d) to output either signals on bus 120 or signals on bus 110 to the memory 90(d). The output data associated with the multiplexer 92(d) is placed upon bus 100.

Subsequently, memory 90(d) outputs the received data upon bus 122 to register 114(e). Thus, in the aforementioned manner, either the video input data originally received upon bus 82 or image processing data which appears upon bus 110 is serially shifted through the memory units 90(a-d) and is subsequently stored within the window shift register window assembly (FIG. 2), which is comprised of elements 114(a-e) of FIG. 3. This shifting is done into window shift register window assembly in order to allow the video or control data on busses 84 and 82 respectively to be accessed and used by subprocessors 58, 60, 62, and 64.

The address generator and read/write controller assembly 102 is used, in the aforementioned operation, to allow data to be written to memories 90(a-d) by sending a typical enabling signal on bus 104 thereto. Also, controller address generator and read/write controller assembly allows data to be written therefrom in response to a signal on bus 106.

Address generator and read/write controller assembly further defines which addresses, of memories 90(a-d), the received data will be placed within by the use of usual counter mechanisms. This address definition is also sent to memories 90(a-e) by bus 104. The end of scan input signal 108, on bus 82, causes the address generator and read/write controller assembly 102 to note a complete line of scanned data has been received and, in one embodiment, is used by assembly 102 to resynchronize and reset its address counters in order to begin generating addresses for the next line of image data pixels associated with image signals on bus 82.

3. Input/Output Controller

Figure 4:
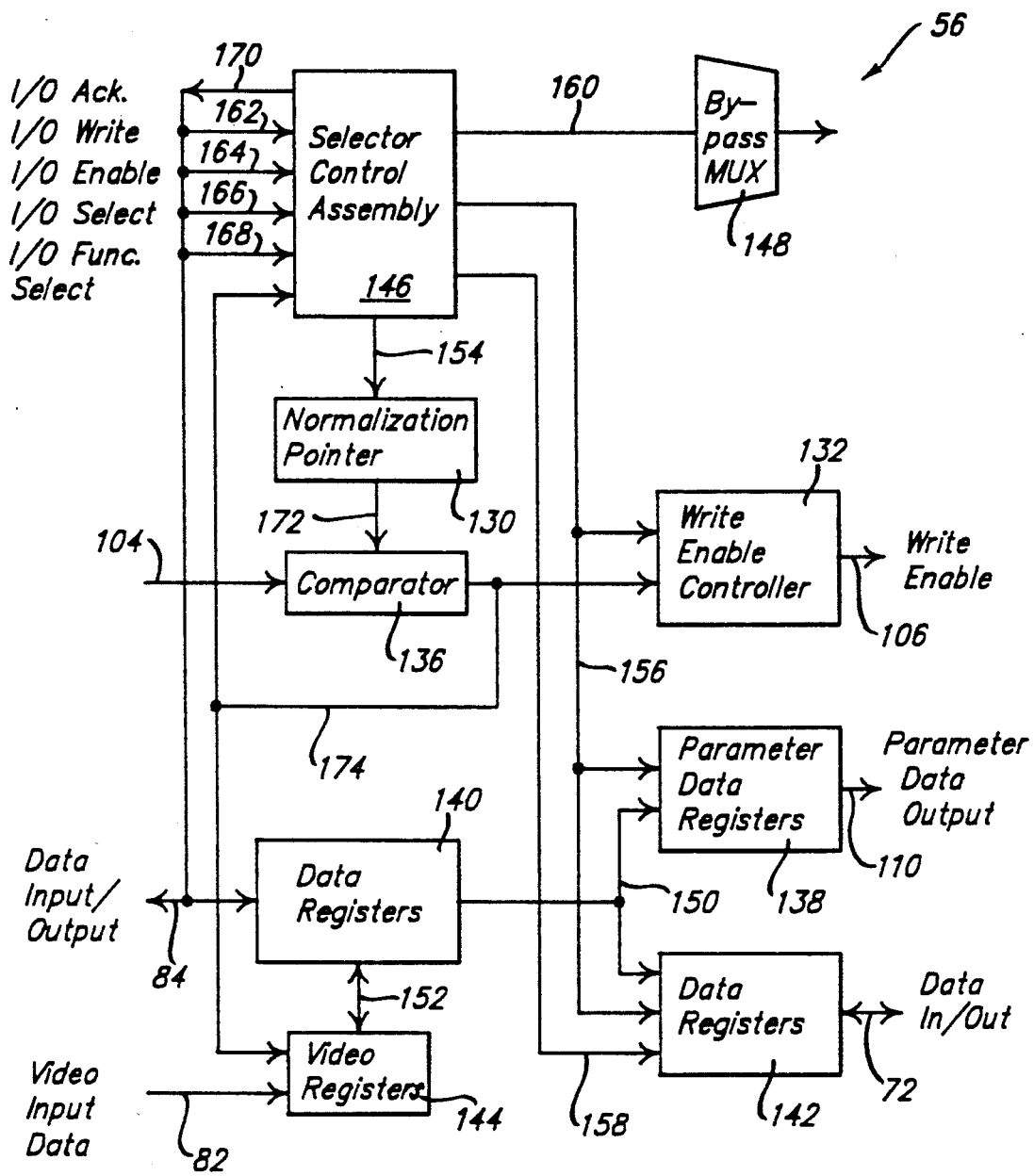
FIG. 4 is a block diagram of the input/output controller shown generally in FIG. 2.

Referring now to FIG. 4 there is shown further details of the input/output controller 56 of FIG. 2 as containing a normalization pointer 130 used for reading data from or writing data to specific locations within storage RAM 50, a write enable controller 132, a comparator 136, parameter data registers 138, data registers 140 and 142, video registers 144, selector control assembly 146, and bypass multiplexer 148.

Specifically, the data registers 140 are coupled to the parameter data registers 138 and to the data registers 142 by signals on bus 150 while receiving input/output data from a previously mentioned external control apparatus by signals on bus 84. Data registers 140 are also coupled to video registers 144 by signals on bus 152, while video registers 144 are coupled to the input video data represented by signals on bus 82.

The selector control assembly 146 is coupled to the normalization pointer 130 by signals on bus 154 and is further coupled to the parameter data registers 138, to the write enable controller 132, and to data registers 142 by signals on bus 156, while additionally being coupled to data registers 142 by signals on bus 158. Additionally, selector control assembly 146 generates a bypass enable signal upon bus 160 which is subsequently sent to the bypass multiplexer 148 which allows data to be sent through image processor 24 without being acted upon by any of the preprocessors 58, 60, 62, or 64 of FIG. 2. (The use of bypass multiplexer 148 will be explained in a later section of this description.)

Additionally, the selector control assembly 146 is coupled to signals on bus 84 which comprises input-/output write signal 162, input/output enablement signal 164, input/output select signal 166, function select signal 168, and input/output acknowledge signal 170. Additionally, comparator 136 is coupled to signals on bus 104 (FIG. 3) which carry address information from the controller assembly 102 and is coupled to the pointer 130 by bus 172, and is further coupled to assembly 146, registers 144, and to controller 132 by bus 174.

In operation, the video data represented by signals on bus 82 is input into the registers 144 and is stored temporarily therein, and parameter data associated with the normalization preprocessor 58 (FIG. 2) is input to data registers 140 by signals on bus 84. The output of data registers 140 is coupled by bus 150 to the parameter data registers 138 and represents parameters associated with the normalization preprocessor block 58 of FIG. 2. The parameter data registers 138 then place these parameters upon bus 110, as mentioned earlier. The parameters associated with signals on bus 110 are output to the individual memories 90(*a-d*) (FIG. 2) (by means of bus enabling signals 112 to multiplexers 92(*a-d*) but are not written thereto until a signal on bus 104, generated by the write enable controller 132, is transmitted to the memories 90(*a-d*). This will occur only if controller 56 issues a signal on bus 106 to assembly 102. That is, the write enable controller 132 must receive a signal upon buses 156 and 174 which will enable the controller 132 to transmit the appropriate write enabling signal on the bus 106.

The signal on bus 174 indicates that an address output, which is placed upon bus 104 from the address generator and read/write controller assembly 102 (FIG. 3), is equal to the contents of pointer 130. The signal on bus 156 indicates that the normalization function has been selected by a signal 168 and that one of the registers associated with the plurality of parameter data registers 138 has been selected by a signal 166. If all these conditions are true, then the signal on bus 106 emanates from write enable controller 132 to the assembly 102, which directs the assembly 102 to allow, by signals on bus 104, parameter data register outputs on bus 110 to be placed in memories 90(*a-d*) in the manner previously described.

The contents of video registers 144 are input into data registers 140 by bus 152 and are latched into registers 140 only when signal on bus 174 is activated by comparator 136. This video data may be output via bus 84 for viewing by users of the image processor 24. Output signals on bus 72 also contains the select signal 168 on bus 158 which is used to select one the preprocessor blocks 58, 60, 62, or 64 of FIG. 2 and also transmits signals on bus 112 to multiplexers 92(*a-d*) in response to signals 166 and 168.

Specifically, as to the input signals 162, 164, 166, 168, and 170 of bus 84, the signal 166 directs the data on bus 84 to a specific entity 50, 52, 54, 58, 60, 62, and 64 (FIG. 2) within image processor 24 while signal 162 determines the direction of data (i.e. input or output) relative to the input/output controller. Signal 164 enables assembly 146 to begin an input/output operation, and signal 170 is sent by assembly 146 to acknowledge receipt of data upon bus 84.

The assembly 146, in one embodiment, comprises a sequential state machine which is enabled by the activation of signal 164. Next assembly 146 examines the state of signals 168, 166 and 162 to determine which preprocessor 54–64, which register in the selected preprocessor 54–64, and which direction the data is directed respectively. The selection and direction are made over bus 156 and bus 158 to register 142. After selection, the data is input or output from bus 84 by means of data registers 140. Completion of the cycle is indicated by the activation of signal 170. If the normalization function is selected by signals 168 then the acknowledgment is held off until comparator 136 has indicated an address match on bus 174.

The controller 132, in one embodiment, also comprises a sequential state machine which is enabled by a signal on bus 174 and then examines signals on bus input/output controller and then places a unique output which directs assembly 102 by signals on bus 106, to continuously perform read/write cycles. If the normalization preprocess is selected, by signal 168, assembly 102 is directed to only read or write at the address set by pointer 130.

4. Normalization

Figure 5:
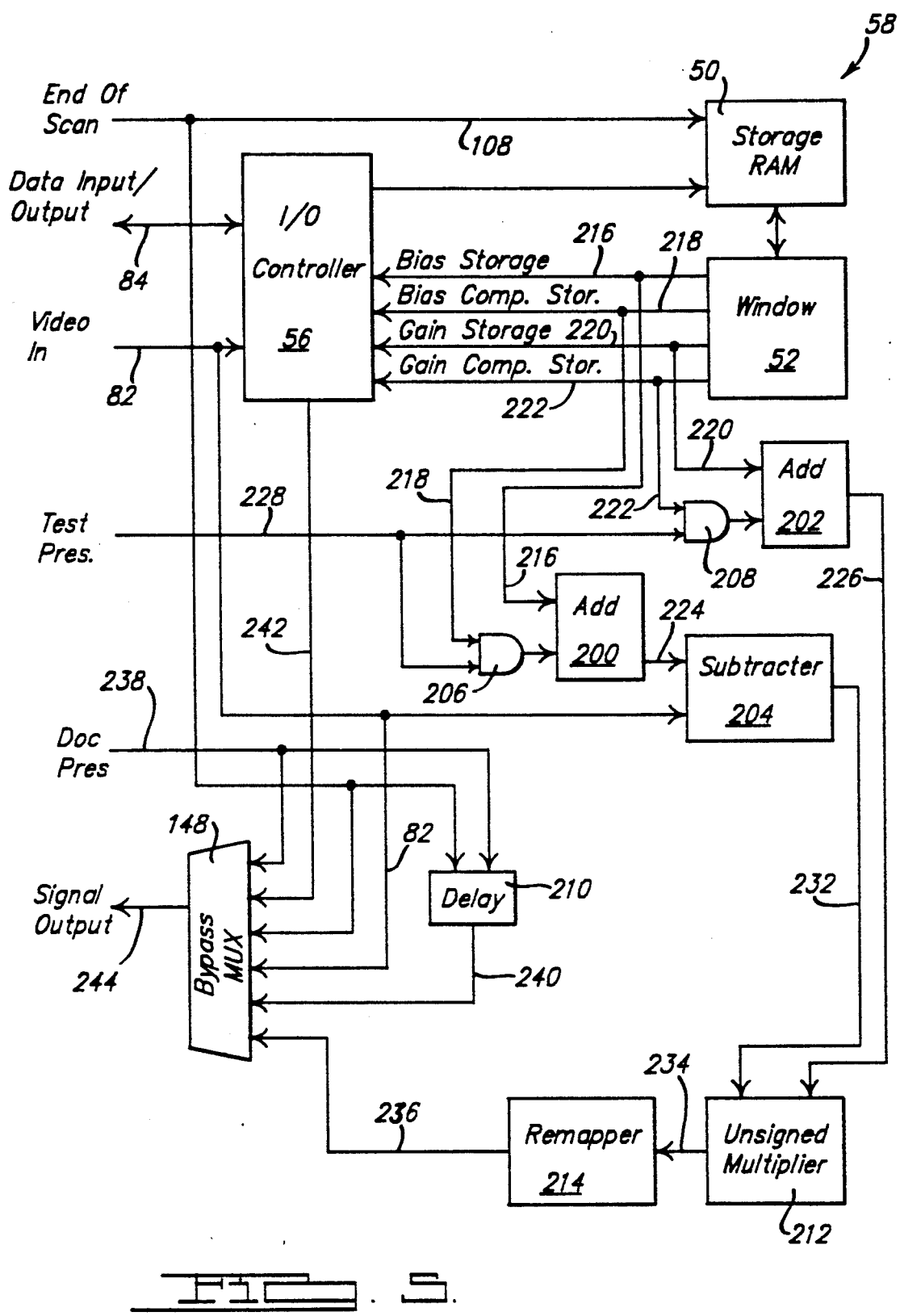
FIG. 5 is a block diagram of the normalization preprocessor block shown generally in FIG. 2.

The purpose of the normalization preprocessor is to correct image defects associated with camera system 11. Referring now to FIG. 5 there is shown a block diagram of further details of normalization preprocessor block 58 of FIG. 2, including adders 200 and 202, subtractors 204, AND gates 206 and 208, delay Unit 210, unsigned multiplier 212, and remapper 214. Also shown is bypass multiplexer 148 which is used to pass data through image processor 24 without traversing the normalization preprocessor block 58.

Signals on lines 216, 218, 220, and 222 are used in conjunction with the logic entities 200, 202, 204, 206, 208, 210, 212, and 214 in order to achieve a test gain and a test bias which generates a repeatable pattern of data. Specifically, the gain compensation and the bias compensation values, present on busses 222 and 218 are calculated in a software routine by the user of the pipeline such that when the two signals on busses 218 and 222 are combined with signals on busses 216 and 220 the aforementioned known repeatable pattern emerges on busses 224 and 226.

AND gate 206 is coupled to a signal on bus 228, which represents a test mode enablement, and to a signal on bus 218. AND gate 208 is also coupled to the signal on bus 228 and to the signal on bus 222. The output of the AND gate 206 is input into the adder 200, along with a signal On bus 216. The adder 202 is coupled at its inputs, to an output of AND gate 208 and to the signal on bus 200. Adders 200 and 202 produce outputs on buses 224 and 226, respectively, which are, in turn, coupled to subtractor 204 and to unsigned multiplier 212, respectively. The output of subtractor 204 is coupled to an input of multiplier 212 of bus 232.

The subtractor 204 has a first input thereof coupled to the video input signals on bus 82. The output of adder 202 is coupled to the unsigned multiplier 212 which produces an output signal on bus 234 for transmission to remapper 214. Remapper 214 then produces, in a manner to be described below, an output on bus 236 which is sent to bypass multiplexer 148.

Additionally, a signal on bus 238 representing the presence of a document is also coupled to the delay assembly 210 which produces an output upon bus 240 for transmission to bypass multiplexer 148. Further, the delay assembly 210 is coupled to an end-of-scan signal on bus 108 and the bypass multiplexer is additionally coupled to the video input signal on bus 82. Bus 108 is as coupled to multiplexer 148.

Finally, the input/output controller is coupled to bypass multiplexer 148 via bus 242 which carries an enablement signal to select which of the input signals to multiplexer 148 Will be passed to the multiplexer output at bus 244 (either delayed output on bus 240 and output on bus 236 or non-delayed output on buses 238 and 82, and 108.

Specifically, the gain and bias (and associated compensation) tables required to perform the normalization function are input into input/output controller by bus 84. The input/output controller routes this table data of four tables to the storage RAM 50 by bus 70 (FIG. 2). Each table is loaded in a separate storage RAM 90(a-d) (FIG. 3).

Following loading of the tables, values of the tables are sequentially output to window shift register window assembly and this output is synchronized with the video data on bus 82. The synchronization of the storage RAM 50 is effectuated by the end of scan signal on bus 108. That is, a signal on bus 108 identifies the last pixel in a video scan and causes the generator address generator and read/write controller assembly to reset to a predetermined initial address.

The outputs of window shift register window assembly (i.e., bias storage signal 216, bias compensation storage signal 218, gain storage signal 220, and gain compensation storage signal 222) are output on bus 70 to control assembly input/output controller where they can be read by a user of image processor 24.

Entities 200-214 were placed within preprocessor block 58 in order to allow testing of the block while providing for identical outputs. The testing methodology generally requires the use of gain and bias compensation signals which, when combined with the typical gain and bias signals, causes the test gain and test bias signals to be generated, which is predetermined to be the same for all of the preprocessor blocks 58, regardless of what channel of data they were operating upon (i.e., in situations where multiple channels of data are processed, in parallel, by a plurality of blocks 58). Because the gain and bias values will be different for each channel, the user must calculate the gain and bias compensation values by taking the difference between the test gain and bias values the user requires, and the actual gain and bias values.

In test mode operation, the signals on the bus 228 enables both the AND gates 206 and 208 and allows the value of signals on the bus 218 and signals on bus 222 to be respectively output therefrom. Thusly, the adder 200 adds signal on the bus 218 to the signal on bus 216 and produces this added signal onto bus 224. The adder 202 then adds the signal on the bus 220 to the signal on the bus 222 and produces this output signal upon the bus 226. The subtractor 204 then subtracts the signal on the bus 224 from each of the pixel values appearing upon signal on the bus 82 and produces an output to the unsigned multiplier 212. The unsigned multiplier 212 then multiplies the outputs of adders 202 and subtractors 204 thereby producing an output signal on the bus 234 to the remapper 214 which converts the seven bit value of incoming data into six bit values of gray-scale video and in one embodiment comprise truly a lookup table. The remapper is used in order to have the data represent the true actual accuracy associated therewith.

In normal operating mode, signals on bus 228 forces the outputs of gate 206 and 208 to zero allowing bias and gain values from busses 216 and 220 to pass unaltered through adders 200 and 202 respectively.

Multiplexer 148 allows a user of image processor 24 to bypass preprocessor block 58 as the need arises. In one embodiment, this entity 148 is provided in order to allow test data to pass through block 58 unaltered.

5. Background Suppression

Figure 6:
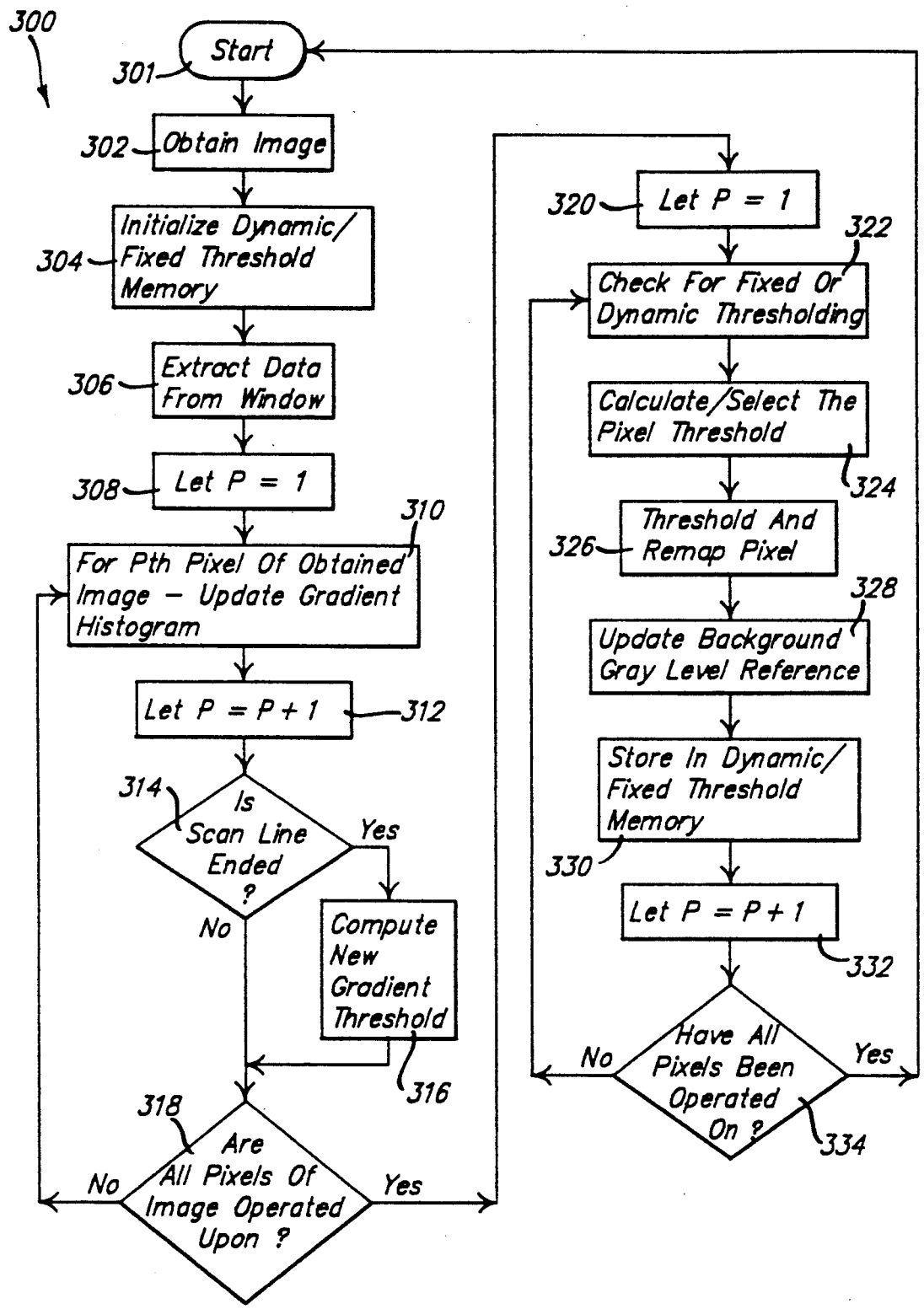
FIG. 6 is a flowchart detailing the steps associated with the background suppression preprocessor block unit shown generally in FIG. 2.

The purpose of background suppression is to eliminate unwanted scenic or patterned background information while retaining printed and written information. Referring now to FIG. 6 there is shown a flowchart 300 which represents the generalized process involved in the background suppression sequence associated with subprocessor 60 of FIG. 2. Many of these general operations associated with flowchart 300 have, in the preferred embodiment of this invention been implemented as a pipelined process in hardware in order to increase the speed associated with subprocessor 60. Essentially, the background suppression function begins with an initial step 301 followed by the step 302 which requires the obtaining of a desired video image. This image is usually placed upon the bus 82 and is input into the shift register window assembly 52 in the manner previously specified. Next, step 304 requires the initialization of a dynamic/fixed threshold memory which is used to determine if the threshold will be dynamic or fixed for each of the individual pixels within the obtained image and is used to store a fixed threshold (which may be updated—to be explained later) therein (i.e. a gray-scale background reference).

The next step 306 requires the extraction (from each of the image pixels within the window assembly 52) of data (to be later explained). The next step 308, is associated with the initialization of a variable "P" used for explanatory purposes only, while the next step, 310 requires the obtainment and updating of a gradient histogram for each of the pixels of the obtained image associated with the variable "P".

Step 312 requires the incrementation of the variable "P" which represents an index to each pixel in the acquired image and is followed by step 314 which requires image processor 24 to determine if a scan of the acquired image line has ended. If a scan line has indeed ended, then step 314 is followed by step 316 which requires the computation of a new gradient threshold associated with the portion of the acquired image which has been inspected. If a scan line has not been ended, then step 314 is followed by step 318 which requires a determination, if all the pixels of the image have operated upon. If all the pixels have been operated upon, then step 318 is followed by step 310. If the determination in step 318 is that all the pixels of the image have been operated upon, then step 318 is followed by step 320 which reinitializes the previously defined variable "P". A gradient threshold, therefore, has been generated for each column or vertical scan line of the image at this point.

Step 320 is followed by step 322 which requires the checking for fixed or dynamic thresholding. Step 322 is followed by step 324 which requires calculation and selection of the pixel threshold. Step 324 is followed by step 326 which requires a thresholding and remapping of the pixel, and step 328 is followed by step 326 which requires the updating of the background gray-level reference associated therewith.

Step 330 follows step 328 and requires the storage in the dynamic/fixed threshold memory of the updated background gray-level reference, and step 332 follows step 330 which requires image processor 24 to update the previously defined variable "P". Step 334 follows step 332 and requires image processor 24 to determine if all of the pixels have been operated upon. If all the pixels have not been operated upon, then step 334 is followed by step 322. However, if all the pixels of the obtained image have been operated upon, then the initial state 301 is re-entered.

Figure 7:
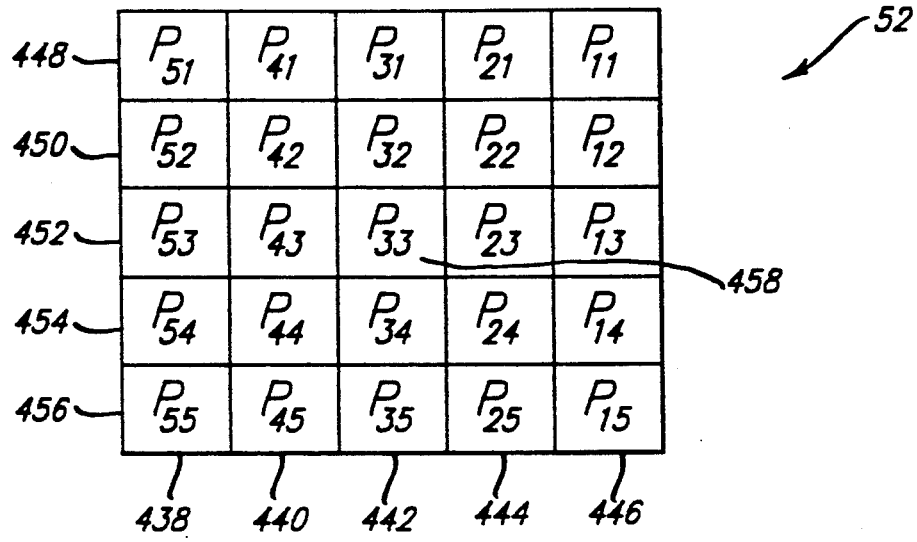
FIG. 7 is a diagram showing the contents of the window which is shown generally in FIG. 2.

In order to fully understand the utilization of the following steps by the background suppression subprocessor 60 of FIG. 2, it is now necessary to turn to FIG. 7 which shows a typical pixel packing associated with the shift register window assembly 52 of FIGS. 2 and 3. That is shift register window assembly 52 is seen to have columns 438, 440, 442, 444, and 446 and rows 448, 450, 452, 454, and 456. Each intersection of a row 438, 440, 442, 444, and 446 with an associated column 448, 450, 452, 454, and 456 yields a unique pixel value 458 associated with the acquired image which was represented by signals on bus 82 (FIG. 2). For example, the pixels associated with column 442 are designated as "$P_{31}$", "$P_{32}$", "$P_{33}$", "$P_{34}$", and "$P_{35}$".

Figure 8:
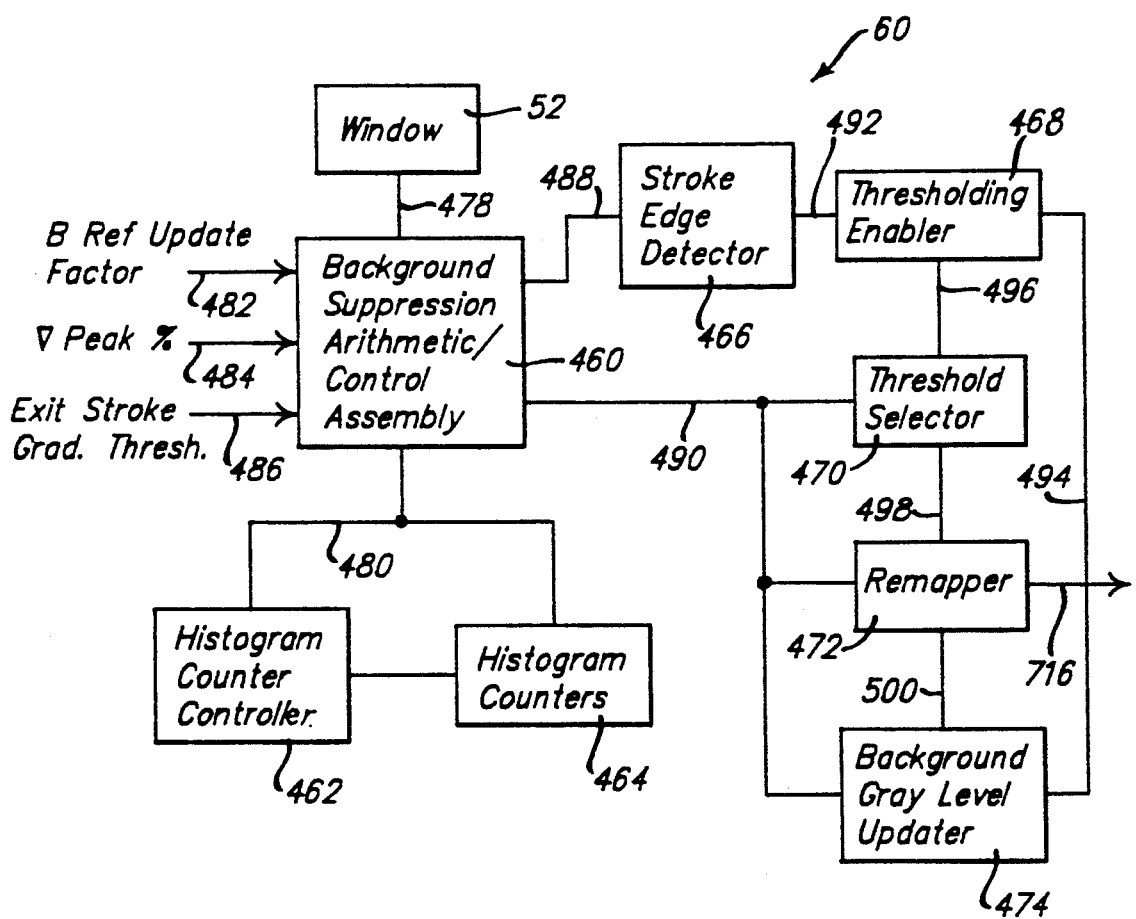
FIG. 8 is a block diagram of the background suppression preprocessor block shown generally in FIG. 2.

Turning now to FIG. 8, there is shown a more detailed block diagram of the background suppression subprocessor 60 of FIG. 2. Subprocessor 60 includes an arithmetic and control assembly 460, a histogram counter controller 462, a plurality of histogram counters 464, a stroke edge detector 466, a thresholding enabler 468, a threshold selector 470, a remapper 472, and a background gray-level updater 474.

The background suppression arithmetic/control assembly 460 is coupled to shift register window assembly 52 by signals on bus 478 and is coupled to the histogram counter controller 462 and to the plurality of histogram counters 464 by bus 480. Control assembly 460 additionally is coupled to signals 482, 484, and 486 which respectively represent a background reference update factor, a change in peak percentage, and an exit stroke gradient threshold value (all of which will be herein explained). These signals initially appear on bus 84 and are programmably input from a user of image processor 24 of FIG. 2 to the controller 56.

Additionally, the control assembly 460 is coupled to the stroke detector 466 by bus 488 and to the threshold selector 470, the remapper 472, and to the background gray-level reference updater 474 by bus 490. Enabler 468 is coupled to the detector 466 by bus 492, to updater 474 by bus 494, and to the threshold selector 470 by bus 496. The remapper 472 is coupled to the selector 470 by bus 498 and to the updater 474 by bus 500.

In operation, the histogram counter controller 462 and histogram counters 464 are used to create a histogram of gradient magnitudes associated with the acquired image in order to dynamically process the image knowing frequently occurring gradient magnitudes that exist therein. The histogram is updated with each new pixel 458 in the shift register window assembly 52, in practice. This tailoring of gradients, in a dynamic fashion, is seen to increase the usefulness of the background suppression operation. That is, the background patterns with fairly high contrast could interfere with a typical background suppression algorithm. The gradient histogram allows the image processor 24 to distinguish between infrequently occurring high contrast printing and more frequently occurring low contrast background patterns, and allows these more frequently occurring patterns to be suppressed.

The control assembly 460 is used to control the histogram counter controller 462 and counters 464, the stroke edge detector 466, the selector 470, and the updater 474 while calculating a plurality of values associated with the imaging process. The dynamic/fixed threshold memory is contained, in this embodiment, in assembly 460 and is used to determine if a particular pixel 458 within the acquired image will have a dynamic or fixed thresholding associated therewith while the thresholding enabler 468 enables either the dynamic or the fixed thresholding.

The stroke edge detector 492 signals enabler 468, by bus 492, when a contrast change has occurred which is caused by the detection of the leading and trailing edges of printed or written strokes upon the image. The threshold selector 470 then computes the dynamic threshold, if it has been previously selected, or allows fixed thresholding to occur. The remapper 472 readjusts the gray-level associated with the threshold and pixel 458 in question, based on the threshold selector 470 and the updater 474 then updates the gray-level or fixed thresholding reference. As previously alluded to, it has been determined that the dynamic thresholding has yielded empirically better results than the results associated with the fixed thresholding due to the fact that the dynamic thresholding may be modified for different pixel values rather than having one single thresholding value to which all the pixels are represented against.

Figure 9:
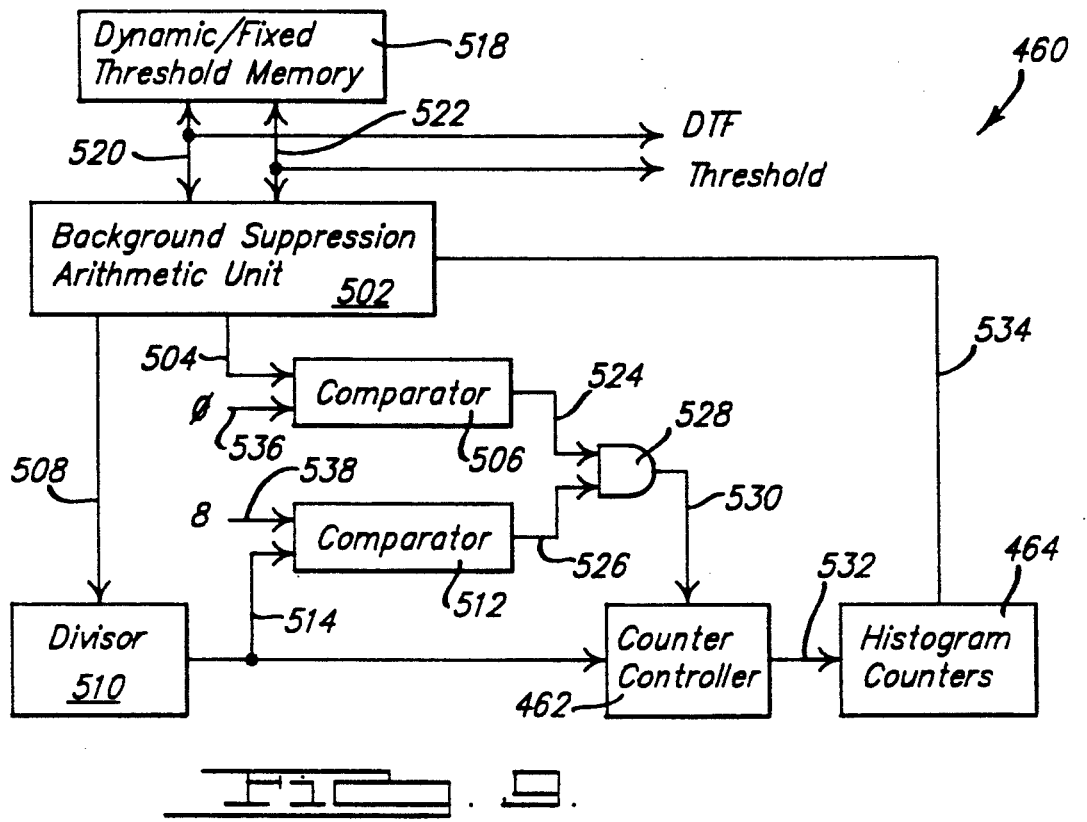
FIG. 9 is a block diagram of the histogram counter control shown generally in FIG. 8.

Referring now to FIG. 9, there is shown further details of the background suppression arithmetic control assembly 400 and controller and counters 462 and 464 respectively (FIG. 8). Assembly 400 is seen to contain a background suppression arithmetic unit 502 coupled by bus 504 to a comparator 506 and further coupled by the bus 508 to a divisor unit 510. Additionally, the divisor unit 510 is coupled to a comparator 512 by bus 514 and is coupled to the counter controller 462 by the same bus 514. The dynamic/fixed threshold memory 518 is coupled to unit 502 by busses 520 and 522.

The dynamic/fixed threshold memory 518 contains two pieces of data for each pixel position in a channel of data 82 (FIG. 2). The two pieces of data are a dynamic threshold flag bit (signal on bus 520) and a background gray level reference (signal on bus 522).

The flag bit, on bus 520, is "set" to indicate that at the pixel location in a scan, dynamic thresholding should be used to separate character strokes from background. The value of this background gray level reference is revaluated for every scan line of the channel (hereinafter explained). If the flag bit is cleared, then a fixed or background gray level reference threshold is used to separate strokes from background data.

The comparators 506 and 512 output signals on the buses 524 and 526 which are input into an AND gate 528. The output of AND gate 528 is coupled by bus 530 to counter selector controller 462. The counter selector 462 outputs signals on the bus 532 which are input into the histogram counters 464. The histogram counters 464 place an output signal on bus 534 which is coupled to the background suppression arithmetic/control unit 502.

In operation, the background suppression arithmetic unit 502 is used to generate a plurality of quantities associated with each of the pixels within the window shift register window assembly 52. These values include a current horizontal gradient, a current vertical gradient, a current gradient magnitude, previous horizontal gradient, previous vertical gradient, previous gradient magnitude, and an average local gray value. All of these aforementioned values are associated with a single pixel 458 shown in FIG. 7.

The following computational examples are with reference to pixel "$P_{33}$" which is placed within column 442 and row 452 of window shift register window assembly 52, as shown in FIG. 7. The current horizontal gradient for pixel "$P_{33}$" is defined to equal the gray-scale value associated with pixel "$P_{23}$" minus the current gray-scale value associated with pixel "$P_{43}$". The current vertical gradient associated with pixel "$P_{33}$" is defined to be the current gray-scale value associated with pixel "$P_{34}$" minus the current gray-scale value associated with pixel "$P_{32}$". The current gradient magnitude is defined to be the absolute value of the current horizontal gradient plus the absolute value of the current vertical gradient. The previous horizontal gradient associated with pixel "$P_{33}$" is defined to be the gray-scale value associated with pixel "$P_{13}$" minus the gray-scale value associated with pixel "$P_{33}$". The previous vertical gradient is defined to be the gray-scale value associated with pixel "$P_{24}$" minus the gray-scale value associated with pixel "$P_{22}$". The previous gradient magnitude is defined to be the absolute value of the previous horizontal gradient plus the absolute value of the previous vertical gradient. The average local gray value associated with pixel "$P_{33}$" is defined to be a summation of gray-scale values associated with pixels "$P_{22}$", "$P_{23}$", "$P_{24}$", "$P_{32}$", "$P_{33}$", "$P_{34}$", "$P_{42}$", "$P_{43}$", "$P_{44}$", plus two times the summation of the gray-scale values of pixels "$P_{11}$", "$P_{13}$", "$P_{15}$", "$P_{31}$", "$P_{35}$", "$P_{51}$", "$P_{53}$", "$P_{55}$". This summation is then divided by twenty-five to yield the aforementioned average local gray value.

After these quantities have been computed, the horizontal gradient is input to the comparator 506 of FIG. 9 by signals on the bus 504. A value of zero is also input into the comparator 506 along the bus 536. The comparator 506 then compares the value of zero which is defined by the bus 536 with the horizontal gradient placed upon the bus 504 and, if the value of the horizontal gradient, as previously defined, is greater than zero, then comparator 506 places a logical high value onto the bus 524. Each pixel 458 has six bits of data associated therewith at this point, in one embodiment.

The comparator 512 has an input coupled to the bus 514 which is also coupled to the divisor 510. The divisor 510 divides the current gradient magnitude, on bus 508, by three and outputs the signal onto bus 514. The comparator 512 also has an input coupled to the bus 538 which is defined to be eight and compares the value of eight to the value upon bus 514. If the value of bus 514 is greater than eight, then the signal on the bus 526 is defined to be logically low. If the value upon bus 514 is less than eight, then the signal on bus 526 is defined to be logically high. The AND gate 528 then outputs a signal on the bus 530 which is logically high, if the horizontal gradient associated with the pixel in question is greater than zero, but having a current gradient magnitude being less than twenty-five. Should these conditions be satisfied, then the signal on the bus 530 is output from the AND gate 528 to the counter controller 462 and which enables the counter controller 462 such that one of the plurality of histogram counters 464 is activated.

The counter that is activated is defined by the signal on bus 532. That is, each of the counters within the plurality of histogram counters 464 is uniquely addressed by signals on bus 532. Thus, a histogram of values associated with each of the pixels in the assigned image is built such that the most frequently occurring gradients that exist within an image may be defined. Each of the counters within the plurality of counters 464 are addressed by the output of divisor 510. Therefore, the background suppression steps 201-314 of the flowchart of FIG. 6 have now generally been explained relative to the background suppression associated with subprocessor 60. In order to detail the general computation of a new gradient threshold associated with step 316 of FIG. 6, it is necessary now to refer to FIG. 10.

Figure 10:
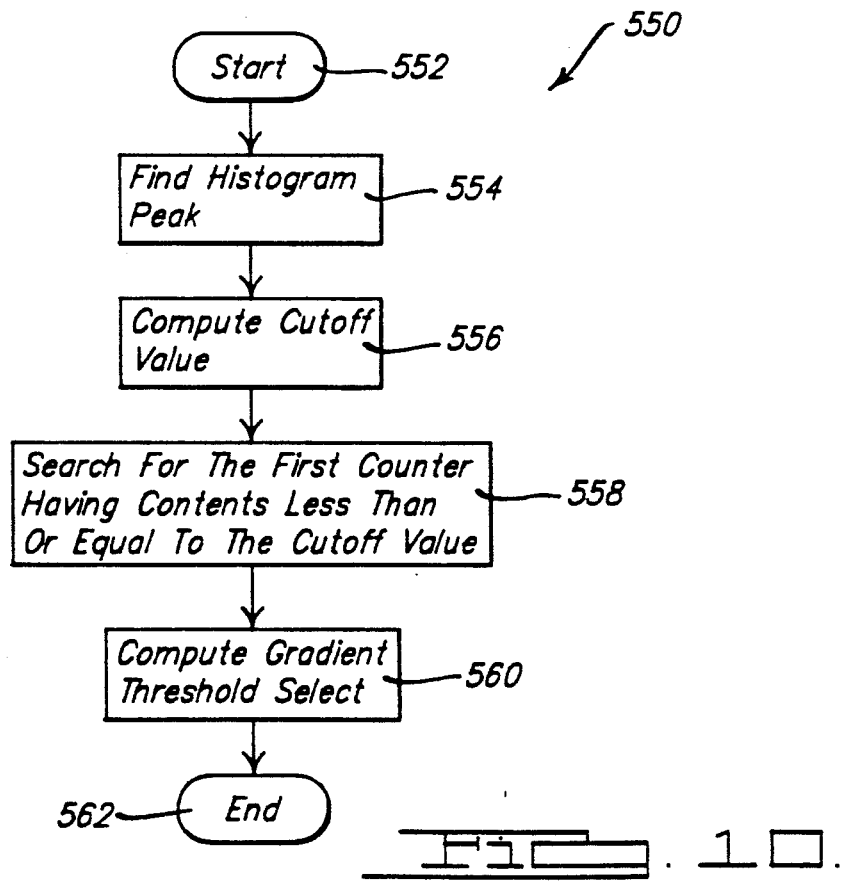
FIG. 10 is a flowchart detailing the computation of a new gradient and threshold which is shown generally in FIG. 6.

Specifically, flowchart 550 of FIG. 10 begins with an initial step of 552 which is followed by step 554 which requires subprocessor 60 of FIG. 2 (i.e. entity 462 therein) to define a histogram peak. That is, controller 462 examines all of the counters within the plurality of histogram counters 464 to determine which one has the highest value. The counter within entity 464 with the highest value determines the peak. Step 556 follows step 554 and requires the subprocessor 60 to compute a cutoff value. This cutoff value is defined to be the value of the counter (within counters 464 having the highest value) multiplied by the signal 484 (FIG. 8) which may be programmed by the user of processor 24.

Signal 484, in the preferred embodiment of this invention represents a change in the gradient peak and in the preferred embodiment of this invention is typically 25%. This value was empirically derived and found to give adequate separations between background gradients represented by the peak of the histogram counters 464 and printed character stroke gradients represented by those gradients exceeding the cutoff value.

Next, step 558 follows step 556 and requires subprocessor 60 (i.e., controller 462) to search for the first histogram counter having contents less than or equal to the new cutoff value. Step 560 then follows step 558 and requires subprocessor 60 to compute a gradient threshold select, which is substantially equal to the following:

(address of histogram counter having highest value$\times 3$)+1

Step 560 is then followed by step 562 which defines the end of flowchart 550.

Figure 11:
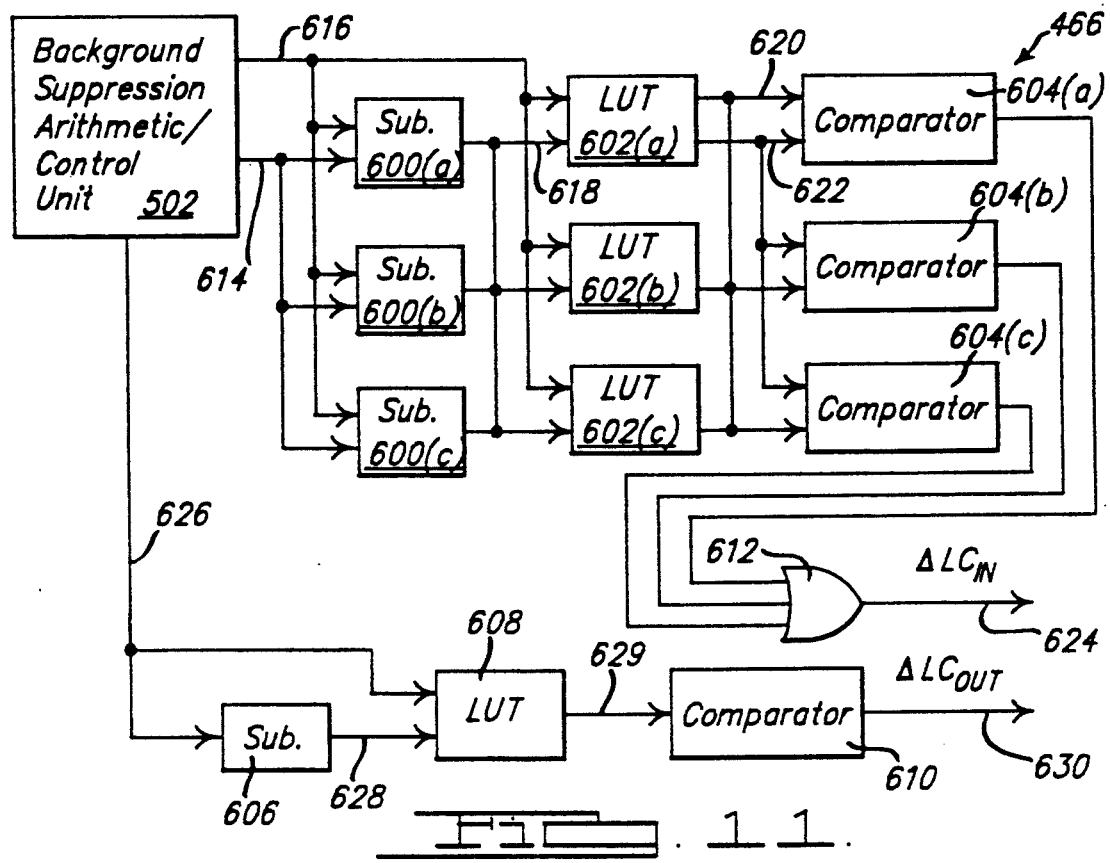
FIG. 11 is a block diagram of the edge detector assembly shown generally in FIG. 8.

Referring now to FIG. 11 there is shown more detail of the stroke edge detector 466 of FIG. 8 as containing subtractors 500(a-c), lookup tables (LUT) 602(a-c) (which may be externally placed relative to the ASIC), comparators 604(a-c) (which may also be externally placed), subtractor 606, lookup table 608, comparator 610, and OR gate 612. Specifically, the background suppression arithmetic control unit 502 is coupled to subtractors 600(a-c) by buses 614 and 616 while also being coupled to lookup tables 602(a-c) by signals on the same bus 616. Subtractors 600(a-c) are coupled to the lookup tables 602(a-c) by bus 618, while lookup tables 602(a-c) are coupled to comparators 604(a-c) by buses 620 and 622.

In operation, the stroke edge detector 466 is used to determine the change in local contrast associated with every pixel 458 within the acquired image on bus 82. The change in local contrast is computed both in terms of coming into a handwritten or printed stroke and exiting a handwritten or printed stroke within the same pixel. The operation of the stroke edge detector 466 will now be explained in terms of a single pixel, that of pixel "$P_{33}$" of FIG. 7, but it should be apparent to one of ordinary skill in art that each of the pixels associated with window shift register window assembly, and illustrated in FIG. 6, may be processed in a substantially similar manner.

Unit 502 (see FIG. 9) obtains the gray-scale values associated with pixels "$P_{23}$", "$P_{13}$", and "$P_{33}$" from the window configuration shift register window assembly by signals on bus 478 (FIG. 8). These gray-scale values are then placed upon bus 614 and input into subtractors 600(a-c). Subtractor 600(a) subtracts the gray-scale value of pixel "$P_{33}$" from that of pixel "$P_{23}$" and outputs the difference on bus 618 to lookup table 602(a). Subtractor 600(b) subtracts the gray-scale value of pixel "$P_{33}$" from that of pixel "$P_{13}$" and outputs the subtracted value on bus 618 to lookup table 602(b). Subtractor 600(c) subtracts pixel "$P_{33}$" from the background reference threshold, which has been fixed and stored within the unit 502, and outputs the subtracted value to the lookup table 602(c) by bus 618.

Additionally, unit 502, by signals on bus 616, outputs the gray-scale value of pixel "$P_{23}$" to lookup table 602(a), the gray-scale value of pixel "$P_{13}$" to lookup table 602(b), and the background gray-scale reference value to lookup table 602(c).

Signals on bus 618 are then used as addresses to access a local contrast value which has already been stored and which is assigned to a given change in pixel level value. Upon receipt of signals on bus 616, tables 602(a-c) output this change in local contrast to comparators 604(a-c) by signals on bus 620. Additionally, comparators 604(a-c) also are coupled by bus 622 to lookup tables 602(a-c), and tables 602(a-c) output thereto a stored (empirically formulated) contrast threshold which may be modified by a user of image processor 24 which, in the preferred embodiment of this invention, is 35.

Comparators 604(a-c) then compare the change in local contrast which is calculated by lookup tables 602(a-c) with the contrast threshold (i.e., 35) and determine if the changes in local contrast associated with these lookup tables 602(a-c) is greater than this threshold. If any of these changes in local contrast are indeed greater than the threshold, then OR gate 612 outputs a logical one onto bus 624.

The subtractor 606 is used in cooperation with lookup table 608 and comparator 610 to determine the change in local contrast associated with exiting from a stroke within the image in question. Specifically, assembly 502 inputs the gray-scale value associated with pixels "$P_{33}$" and "$P_{13}$" to the subtractor 606 by bus 626. Assembly 502 also inputs to lookup table 608 the background gray-scale reference value associated therewith along the same bus 626. Subtractor 606 then subtracts the gray-scale value associated with the pixel "$P_{13}$" from the gray-scale associated with the pixel "$P_{33}$" and outputs the subtracted value to the table 608 by signals on bus 628.

Lookup table 608 then calculates the change in local contrast based upon the background reference gray-scale associated with signals on the bus 626 and the subtracted signal on the bus 628 and inputs this, by bus 629, to comparator 610. This calculation is defined as: $[(P_{33}-P_{13})/\text{Background Reference gray-scale}]*100$.

The comparator 610 then compares the output value associated with the change in local contrast for the exiting stroke associated with the active pixel 458 against an empirically derived threshold contained in table 608. In the preferred embodiment of this invention it is 25. If, indeed, this threshold has been exceeded, comparator 610 produces a logical one on bus 630 indicating change in local contrast in the exiting direction associated with the local pixel 458 from a printed or written document stroke.

Referring now to FIG. 12, there is shown details of the threshold enabler 468 of FIG. 8 as containing a NOT gate 650, an AND gate 652, comparators 654, 656, and 658, a latch 660, OR gate 662, AND gates 664, 666, and 668, comparators 670 and 672, and an AND gate 674.

Specifically, AND gate 652 is coupled to the latch 660 by bus 676, while the NOT gate 650 is coupled to the latch 660 and to a first input of AND gate 664 by bus 678.

The output of OR gate 662 is coupled to a second input of AND gate 664 by bus 680. A first input of OR gate 662, is coupled to the output of AND gate 666 by signals on bus 682. A second input of AND gate 662 is coupled to an output of comparator 654 by signals on bus 684, and a third input of AND gate 662 is coupled to bus 630. AND gate 666 has a first input coupled to an output of AND gate 668 via bus 686 and a second input coupled to an output of AND gate 674 by bus 688. AND gate 652 has a first input coupled to bus 624 and a second input coupled to the dynamic thresholding signal on bus 520 which emanates from the dynamic threshold memory 518 of FIG. 9.

Comparator 654 has a first input coupled to the gray-scale value of the active pixel (i.e. pixel "$P_{33}$") obtained from the window shift register assembly 52 by bus 478 and a second input coupled to the background gray-scale reference signal 690 which is stored in the dynamic/fixed threshold memory 518 of FIG. 9 (and which will be explained later). Comparator 656 has a first input coupled to the current gradient magnitude via busses 488 and 492 from assembly 460 (FIG. 8) and a second input coupled to signal 682 which is a gradient threshold associated with an exit stroke of the active pixel (i.e., pixel "P$_{33}$") and which is empirically defined by the user of image processor 24 and in the preferred embodiment of this invention, this exit stroke gradient threshold comprises a value of seven out of a possible range of 0 to 127.

Comparators 658 and 656 have a first input coupled to the gradient threshold associated with the exit stroke (i.e., signal 486) and comparators 658 and 656 have a second input coupled via busses 492 and 488 to the previous vertical gradient associated with the background suppression arithmetic control assembly 460 (FIG. 8) and the current vertical gradient (by busses 492 and 489) respectively. The outputs of comparator 656 and 658 are respectively placed on bus 659 and 661 to gate 668. Comparator 670 has a first input coupled by bus 492 and 488 to the current horizontal gradient and a second input coupled to bus 692 which carries a logically zero signal. The comparator 672 likewise has a first input coupled, to the logically zero signal on bus 692 and a second input coupled to the previous horizontal gradient on busses 492 and 488. The outputs of comparators 670 and 673 are input to AND gate 674 by signals on bus 694.

In operation, the dynamic threshold flag signal on bus 520 is inverted by gate 650, and this inverted signal is then sent to the input of latch 660. Additionally, the AND gate 652 will cause signal on bus 678, from inverter 650, to be latched by latch 660 when the conditions at the input of gate 652 produce a signal on the bus 676 which is logically high. Thus, the AND gate 652 cooperates with the latch 660 in producing a disabling signal, on bus 688, for the dynamic threshold select whenever the dynamic threshold flag signal on bus 520 is logically high and entry into a printed stroke is docketed by signal on bus 624 going to a logically high state. In other words, dynamic thresholding is disabled if it has been previously enabled and a printed stroke, of the image, is being processed requiring no dynamic thresholding.

The signal on the bus 696 will comprise an enablement signal for the dynamic thresholding as long as any one of the signals on the buses 630, 684, or 682 are logically high and the enablement flag signal on bus 520 is low. That is, since the AND gate 664 logically combines signals on the bus 678 and 680, these signals must be both logically high in order for the signal on bus 696 to be the same. Therefore, the signal on the bus 520 must be logically low in order for the signal on the bus 678 be logically high. Additionally, in order for the signal on the bus 680 to be logically high, one of the signals on the buses 630, 684, and 682 must be logically high due to the operation of the OR gate 662.

The signal on the bus 630 will be logically high if the aforementioned output of the comparator 610 (FIG. 11) is logically high. The signal on the bus 684 will be logically high if the gray-scale value associated with the pixel in question (i.e. "P$_{33}$") is higher than the background gray-scale reference value associated with signal 690. The signal on the bus 682 will be logically high if the signals on the buses 686 and 686 are both logically high. Therefore, in order for the signal on the bus 686 to be logically high, the output of both comparators 656 and 658 must be logically high at the same time. This will occur if the current gradient threshold associated with the pixel in question is greater than the exit stroke gradient threshold and if the previous gradient threshold is greater than the exit stroke gradient threshold as well.

Signals on the bus 688 will be logically high if the output of the comparators 670 and 672 are logically high. This will occur only if the horizontal gradient is negative and the previous horizontal gradient is negative as well. Should the signals on the buses 686, and 688 all be logically high, then the signal on the bus 682 will be logically high and will cause the dynamic thresholding to be enabled via a logically high signal on the bus 696.

Referring now to FIG. 13, there is shown details of the threshold selector 470 of FIG. 8 as containing a comparator 700, a lookup table 702, and a multiplexer 704. Specifically, the comparator 700 is coupled to signals on bus 490 (FIG. 8) which carry the current gradient magnitude and the calculated gradient threshold. Additionally, the lookup table 702 is also coupled to a signal on the bus 490 corresponding to the average local gray value associated with the pixel in questions.

The comparator 700 places its output signals on bus 706 to lookup table 702 which produces an output signal on bus 708 to the multiplexer 704. Multiplexer 704 has its input coupled to the signals on the bus 490 and receives an input associated with the background gray-scale reference value signal 690. The value of the dynamic threshold select signal carried by bus 490 is coupled to a select port of multiplexer 704. Multiplexer 704 produces an output upon bus 710.

In operation, comparator 700 compares the values of the current gradient magnitude to the computed threshold gradient, and if the current gradient magnitude is greater than or equal to the computed threshold gradient produces it a logical one onto bus 706. If the computed threshold gradient, comparator 700, is greater than the current gradient magnitude, then the comparator 700 will produce a logical zero upon the bus 706. The lookup table 702 will then use the signals on bus 706 and the average local gray value associated with the pixel in question to produce a dynamic threshold associated with the pixel. The contents of the lookup table 702 are experimentally derived and associate a threshold value for every average local gray value of the pixel to be thresholded. In the preferred embodiment of this invention the dynamic threshold is approximately 102% of the average local gray value if the signal on bus 706 is a logical "one" and approximately 96% if it as logical "zero" in order to move the threshold up in an area having a relatively high contrast.

This dynamic threshold is output to the multiplexer 704 by signals on bus 708. The dynamic threshold select signal on buses 688 and 696 which are coupled to the bus 496 then selects either a background gray-scale reference value or an output of the lookup table 702 to be output from the multiplexer via bus 710 as the background suppression threshold to be used with the pixel in question ("P$_{33}$" of FIG. 7).

Figure 14:
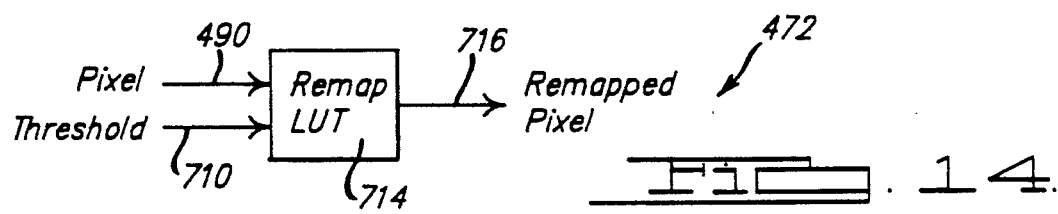
FIG. 14 is a block diagram of the remapper shown generally in FIG. 8.

Referring now to FIG. 14, there is shown further details of the remapper 714 of FIG. 7 as containing a remapped lookup table 714 having a first input coupled to the threshold present upon bus 710 and a second input coupled to the gray-scale value of the pixel in question which is present upon bus 490. The remapped lookup table 714 then compares the threshold value present upon the bus 710 with the gray-scale value of the pixel 490 and produces an output pixel value which is four bits long on bus 716.

Look up table 714 is used, in the preferred embodiment of this invention, to threshold each pixel 458 "$P_{33}$" upon bus 490. This thresholding is used to decide whether to retain the pixel's current gray-scale value or turn it to white and simultaneously remap the pixel from a gray-scale range of 0 to 63 to a gray-scale range of 0 to 15.

Table 714 is created such that there is a separate remapping curve for each possible threshold associated with signals on line 710. Each curve has the following property:

(a) an input pixel gray value greater than the pixel threshold is given an output gray-scale value of 15 (white);

(b) an input pixel gray value less than twenty five percent of the threshold on bus 710 is given an output gray-scale value of zero (black); and (c) an input pixel gray value between the above two levels is given an output gray-scale value between 0 and 15.

This remapping is done to facilitate later ease of compression and scaling, and provides increased character contrast.

Figure 15:
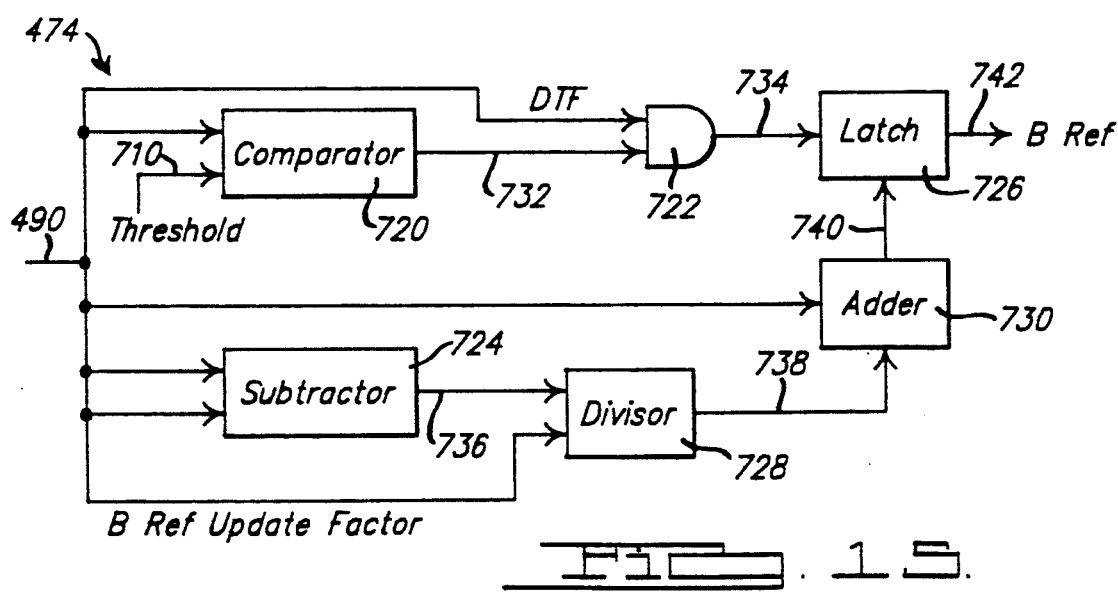
FIG. 15 is a block diagram of the background gray-level updater shown generally in FIG. 8.

Referring now to FIG. 15, there is shown further details of the background gray-level updater 474 FIG. 8 as containing a comparator 720, an AND gate 722, a subtractor 724, a latch 726, a divisor 728, and an adder 730. Specifically, comparator 720 has a first input coupled to the computed threshold value signal on bus 710 and a second input coupled to the gray-scale associated with the pixel "$P_{33}$" by signals on bus 490. Additionally, the subtractor 724 has a first input coupled to the gray-scale value of the pixel "$P_{33}$" by signals on bus 490 and a second input coupled to the background gray-scale reference value, currently used, by signals on bus 490.

The dynamic threshold flag signal on bus 520 (which is coupled to bus 490) is also coupled to AND gate 722 at a first input thereof. An output of comparator 720 is coupled by bus 732 to a second input of AND gate 722, and an output of AND gate 722 is coupled to the control latch 726 by bus 734. An output of subtractor 724 is coupled to divisor 728 by bus 736 and an output of divisor 728 is coupled to a first input of adder 730 by signals on bus 738. An output of adder 730 is coupled to the latch 732 by signals on bus 740. Additionally, the adder 730 has a second input coupled to the background reference gray-scale value associated with signals on the 490, and the divisor 728 has a second input coupled to the background gray-scale reference update factor on bus 490. The background reference gray-scale update factor (signal 482) is empirically determined and loadable to image processor 24 through input/output controller 56. The new background reference factor is output from latch 726 and placed on bus 742.

In the preferred embodiment of this invention, the background reference update factor is determinative of how much of the difference between the current reference value (on bus 490) and the pixel 458 (i.e., "$P_{33}$") will be added to the current reference value to form a new reference value. It has been determined that a continued updating of the reference value yields more accurate results. The preferred embodiment of this invention uses a value of 4 for the background reference update factor.

In operation, the background reference gray-scale value will be updated by the cooperation of the comparator 720, subtractor 224, divisor 728, and adder 730. This background reference gray-scale updated value will be output if a signal on bus 734 enables this to occur. Specifically, the subtractor 724 will subtract the background gray-scale reference value from the gray-scale value of the pixel 458 (e.g., pixel "$P_{33}$") and output the value upon the bus 736 to the divisor 728. The divisor 728 will divide the subtracted value by the background reference gray-scale value update factor which appears upon bus 490 and outputs this divided value via bus 738 to the adder 730. The adder 730 will then add the updated value to the current, existing gray-scale reference value (i.e., signal 482) and outputs the updated value upon the bus 740 to the input of latch 726. The data Will not be accepted by latch 726 until signal on bus 734 is logically high. That is, in order for the latch 726 to input the updated gray-scale value therefrom, the signal upon the bus 490 and the signal upon the bus 732 must both be logically high. This, in turn, requires comparator 720 to determine that the gray-scale pixel value associated with the active pixel 458 (i.e., "$P_{33}$") appearing on bus 490 must be greater than the computed threshold value on bus 710. Additionally the dynamic thresholding signal on buses 490 and 520 must also be logically high. If these two aforementioned conditions are met, then the signal upon bus 734 is logically high and allows the latch 726 to output the updated gray-scale reference value, which is present upon the bus 742, therefrom.

6. Scaling

Figure 16:
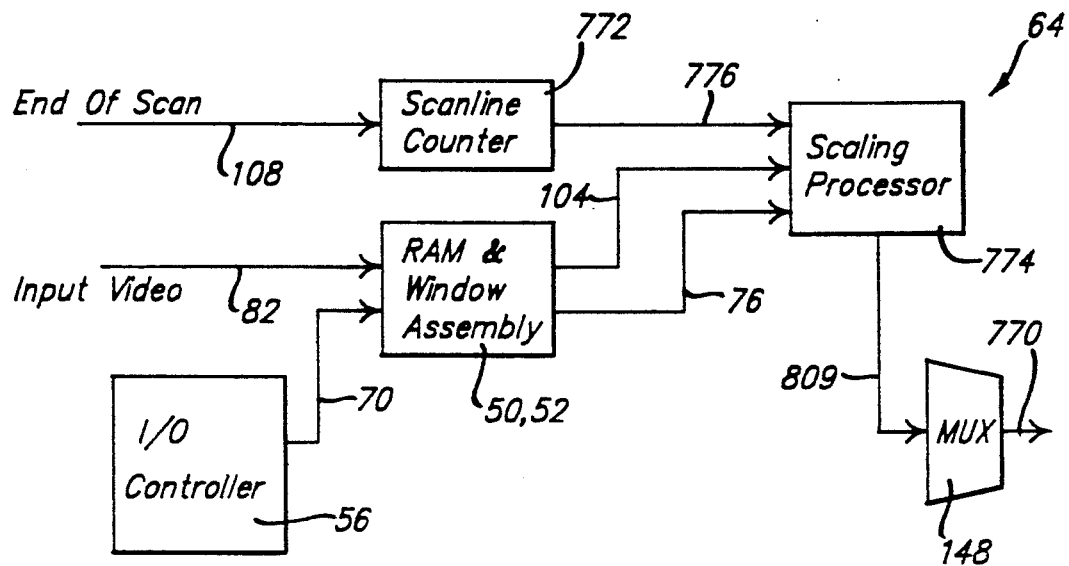
FIG. 16 is a block diagram of the scaling preprocessor block shown generally in FIG. 2.

Referring now to FIG. 16, the scaling subprocessor block 64, which is used to modify the resolution of the image (i.e. by changing its dimension), contains a scan-line counter 772 and a scaling processor 774. The counter 772 is coupled to an end-of-scan signal on bus 108 (FIG. 3) and generates a single count for every "end-of-scan" pulse that appears on bus 108, thereby producing (on bus 776) a running identification of the columns associated with the acquired image. Bus 776 is coupled to an input of scaling processor 774. Additionally, the scaling processor 774 is coupled to row count signals on bus 104 (FIG. 3) and to bus 76. Processor 714 uses the row counts, on bus 104, and column counts, on bus 776 to correctly place the position of each of the pixels within the acquired image. The scaling processor 714 (which may be located off the image processing chip) uses the column count and row count associated with signals on busses 776 and 704, respectively, to produce a scaled output.

Figure 17:
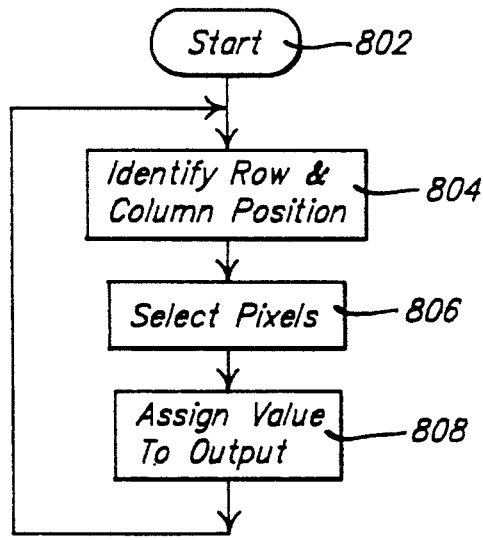
FIG. 17 is a flowchart detailing the steps associated within the scaling processor shown generally in FIG. 16.

Referring now to FIG. 17, there is shown a flowchart 800 which details the operation of the scaling processor 774 which, in the preferred embodiment of this invention, is microprocessor based. The initial step 802, of flowchart 800, is followed by step 804 which requires the scaling processor 774 to acquire the row and column counts of buses 776 and 104 respectively. Step 806 follows step 804 and requires the scaling processor 774 to select pixels of data from the RAM and shift window register assembly 50, 51, by bus 76, wherein these pixels are selected based upon the row in column counts on the buses 776 and 104 respectively.

Step 808 follows step 806 in which the scaling processor 774 processes the acquired pixels in a scaling usual manner and then outputs the processed data onto bus 809 (FIG. 16) to an output multiplexer 148. In the preferred embodiment of this invention, the scaled output value associated with step 808 is a typical median scaled value of the selected pixels. This is proven to retain edge features better than standard averaging techniques. Step 808 is followed by step 804. That is, three columns (i.e. 440, 442, and 444) of pixels and three rows (i.e. 450, 452, and 454) are processed by processor 774 at any instant of time. Processor 774 then discards the center pixel 458 and defines four quadrants as being defined by pixels "$P_{42}$", "$P_{32}$", and "$P_{43}$"; "$P_{22}$", "$P_{32}$", and "$P_{23}$"; "$P_{23}$", "$P_{24}$", and "$P_{34}$"; and "$P_{43}$", "$P_{44}$", and "$P_{34}$" respectively. Each quadrant is then assigned a single gray-scale value defined as the median of the gray-scale value of the pixels within each quadrant. Processor 774 then outputs one gray-scale value per quadrant at a time. This median scaling technique has proven to yield substantially sharper images then many prior scaling techniques.

7. Height Detection

Figure 18:
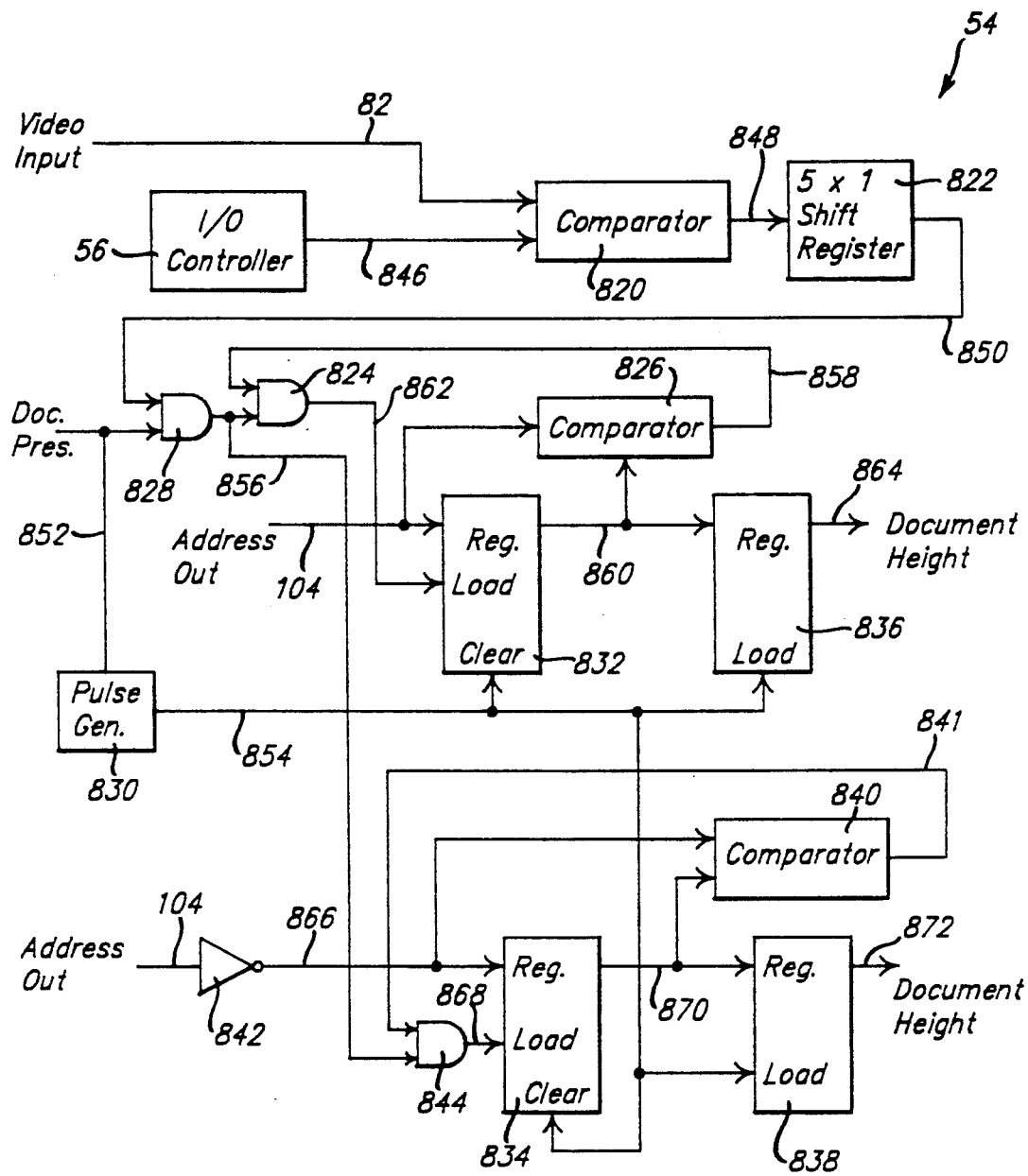
FIG. 18 is a block diagram of the document height detection preprocessor block shown generally in FIG. 2.

Referring now to FIG. 18, there is shown more details of the document height detection subprocessor block 54 of FIG. 2 as containing a comparator 820, a 5×1 bit shift register 822, an AND gate 824, a comparator 826, an AND gate 828, a pulse generator 830, registers 832, 834, 836, and 838, a comparator 840, a NOT gate 842, and an AND gate 844.

A first input of comparator 820 is coupled to video input data on bus 82 and a second input thereof is coupled to input/output controller 56 by bus 846 which carries signals representing a gray-scale background reference. The reference, in the preferred embodiment of this invention has a value of 14. Its purpose is to distinguish between track background and current image data. The comparator 820 compare the video input (on a pixel by pixel basis) to that of the background reference present on bus 846 in order to determine if the pixel is of a document or background type. If the video input signal on bus 82 is whiter than or equal to the background reference signal on bus 846, then the comparator 820 issues a logical one upon bus 848 to the 5×1 bit shift register 822. When the 5×1 bit shift register 822 contains five consecutive values of one therein, a signal on bus 850 to the AND gate 828 is transmitted. A document-present signal (emanating from a camera assembly 11 FIG. 1) is placed on bus 852 and is coupled to a second input of AND gate 828. The trailing edge of the signal upon bus 852 is also input into pulse generator 830 which causes a single pulse to emanate therefrom on bus 854 which is coupled to registers 832, 834, 836, and 838.

The output of AND gate 828 is represented by signals on bus 856 which is coupled to a first input of AND gates 824 and 844. A second input of AND gate 824 is coupled to an output of comparator 826 by signals on bus 858. The comparator 826 has inputs coupled thereto which are represented by signals on bus 104 (FIG. 3) and an output of the register 832 which is represented by signals on the bus 860.

In operation, when five consecutive bits are loaded into shift register 822 and the document-present signal upon bus 852 indicates a document is present, then AND gates issues a logically high command on bus 862 to the AND gates 824 and 844. The AND gate 824 then will issue a signal on bus 862 as a load command to the register 832 in order to have the register 832 load the signals on bus 104 which is coupled thereto.

The load command will issue only if the comparator 826 determines that the contents of the bus 104 are greater than or equal to the contents of the output of the signal on the bus 860, meaning that the document video image was found at a higher position than has previously been determined. This load command on the bus 862 will then cause register 832 to place the current address (on bus 104) therein. The pulse signals on bus 854 will cause the contained value on bus 860 to be transferred to register 836 and cause register 832 to clear. The register 836 will then load the value associated with the signals on bus 860 due to the command associated with the pulse on bus 854 and output this value on bus 864 as an indication of the height of the document 16. When the acquired image is captured by a camera assembly 11 which scans from the bottom of the document to the top thereof, another technique must be used to determine the document height.

To determine the document height of the document 16, when the image acquisition system scans from the bottom to the top thereof, it is first necessary to couple the address, on bus 104, to invertor 842 whose output is coupled to an input of the register 834 via bus 866. This value is not loaded into register 866 until AND gate 844 issues a logically high command on bus 868 thereto. This logically high command will be issued if the input on bus 856 associated with the AND gate 824 is logically high, indicating an occurrence of five consecutive instances of logical ones in shift register 832 and if the output associated with the comparator 840 is logically high as well.

Specifically, comparator 840 compares the output of register 834 on bus 870 with the value of the output of invertor 842 on bus 866. That is, if this inverted value on bus 866 is greater than or equal to the current address value of the register 834, then signal on bus 841 is set to a logical one enabling register 834 to download data.

The pulse signals on bus 854, coupled to registers 834 and 838, and again, in cooperation with signal on bus 841, allows register 834 to send its output data on signal on bus 870 to the register 838 and causes the register 838 to load the sent therein. Register 834 is then cleared to zero. Subsequently, the register 838 outputs the data upon bus 872.

8. Spot/Void Filtering

The spot/void subprocessor 62 is used to fill in voids (i.e., areas of the acquired image having no gray level value associated therewith) and filter out spots (i.e. a dark pixel which is substantially surrounded by white pixels).

Figure 19:
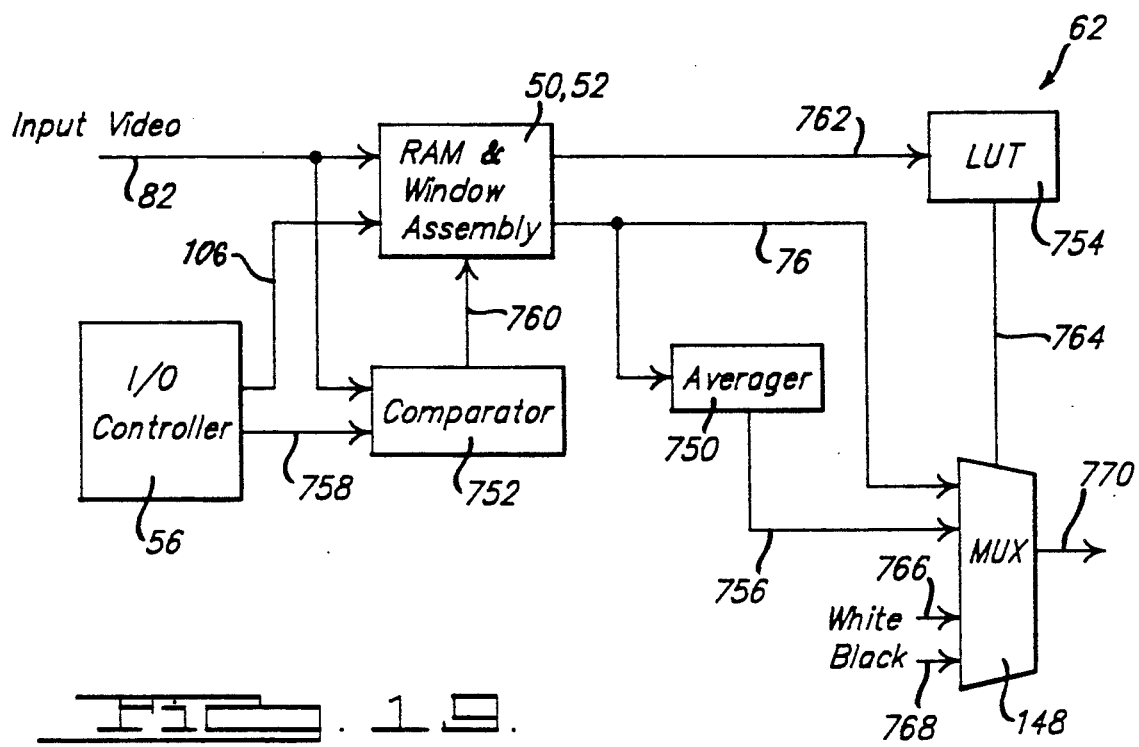
FIG. 19 is a block diagram of the spot/void preprocessor block shown generally in FIG. 2.

Referring now to FIG. 19, there is shown further details of the spot/void filtering subprocessor 62 as containing an averager 750, a comparator 752, and a look up table 754 (which may be externally placed from image processor 24).

Averager 750 has an input coupled to the storage RAM 50 and window shift register window assembly 52 by signals on bus 760. Averager 750 has an output coupled to the bypass multiplexer 148 by signals on bus 756. The comparator 752 has first and second inputs coupled to input/output controller 56 by signals on buses 758 and an input coupled to the video on bus 82 respectively. An output of comparator 752 is coupled to the storage RAM and shift register window assembly by signals on bus 760.

In operation, the spot/void filtering subprocessor block 62 is used to eliminate substantially all isolated white and black spots, voids, and protrusions from the acquired image. Initially, video image data is input via bus 82 to the RAM and shift register window assembly 50, 52 and thereafter to an input of comparator 752.

Comparator 752 then determines if each of the pixels associated with the acquired image is above a certain threshold defined by signals on bus 758. This threshold is loaded through control unit input/output controller 56 and is empirically derived. In the preferred embodiment of the invention its value is 14.

This comparison then produces a binary image from the acquired gray-scale image. This binary image is sent to RAM and shift register window assembly 50, 52 by bus 760. This binary bit patterned image is then output via bus 762 to a lookup table 754, which generates a signal on bus 764 to the bypass multiplexer 148. Additionally, the gray-scale image is sent via bus 76 to the averager 750 which produces an average value for each of the pixels 458 relative to the four pixels "$P_{32}$", "$P_{34}$", "$P_{34}$", and "$P_{43}$" surrounding it, and passes this average by bus 756 to the bypass multiplexer 148. Also, the bypass multiplexer 148 has a white value entered into it by signals on bus 766 and a black value associated with signals on bus 768. The active pixel 458 (i.e., "$P_{33}$" of FIG. 7) is also input into multiplexer 148 by bus 76.

The lookup table 754, generates output signals on bus 764 which are used to select which of the input signals (i.e., signals on buses 756, 766, 768, or 76) that are input to multiplexer 148 and are placed on bus 770. The signal on bus 770 represents a new pixel value associated with the pixel 458 being processed and lookup table 754 selects the output of multiplexer 148 depending upon the bit pattern of the image containing the active pixel 458. If the active pixel 458 represents a spot then white (signal on line 766) is selected otherwise one of signals on lines 768, 82, or 756 are selected based upon the empirically derived table.

9. Pipeline Configuration

Figure 20:
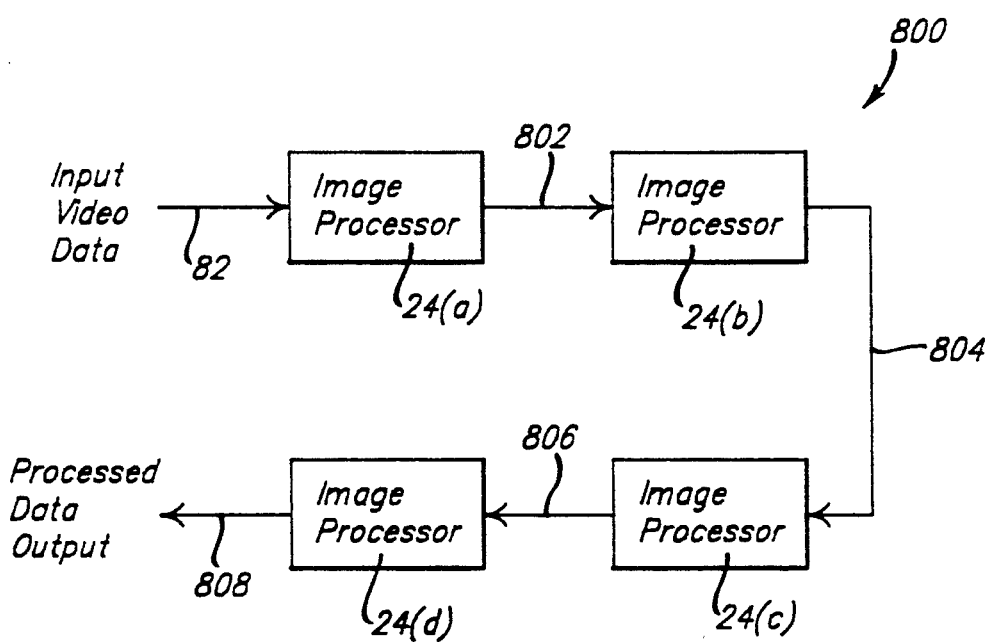
FIG. 20 is an illustration of the image processors of this invention arranged in a pipelined manner.

Referring now to FIG. 20, there is shown a processing pipeline 800 plurality of substantially similar image processors 24(a-d) arranged in a pipelined configuration. Each of the image processors 24(a), 24(b), 24(c), and 24(d) comprise separate application specific integrated circuits and contain all of the subprocessors 58, 60, 62, and 64 shown in FIG. 2. Each processor 24(a), 24(b), 24(c), and 24(d) performs one of the functions associated with subprocessors 58, 60, 62, and 64. This function is chosen by function select signal 168 (FIG. 4) and which may be activated by an external jumpering arrangement. Input video data on bus 82 enters processor 24 which, in one embodiment, performs a normalization operation thereon. This normalized processed video data is then sent to bus 802 by bypass multiplexer 148 therein and then to processor 24(b) which performs background suppression thereon.

Processor 24(b) then outputs the background suppressed data to processor 24(d) by use of its multiplexer 148 and bus 804. Processor 24(c) receives the processed data, on bus 804, and performs spot/void processing thereon. Processor 24(d) then outputs this processed data on bus 806 to processor 24(c) which performs a scaling function thereon and outputs the scaled data on bus 808 as processed data output. Therefore, the use of processors 24(a-d), in the pipelined configuration 800, allows for greater processing efficiency.

It is to be understood that the invention is not to be limited to the exact construction or method illustrated and described above, but that various changes and modifications may be made without departing from the spirit and scope of the invention as set forth in the subjoined claims that follow.

What is claimed is:

1. An image processing device for use with an array of pixel data arranged in rows and columns and corresponding to an image, said device comprising:
    first input means for receiving scanned lines of pixel data;
    second input means for receiving a signal indicating an end of a scan line from an image sensor that generated the pixel data;
    memory means for storing the pixel data in a first matrix;
    address generator means for generating an address for each pixel in a scan line;
    counter means for identifying each of said end of scan line signals;
    output means for providing information regarding each of said scanned lines of pixel data, each of said generated addresses, and said first matrix of pixel data; and
    scaling processor means coupled to the output means and operative to create a plurality of sub-matrices from the first matrix of pixel data, each said sub-matrix being centered about a center pixel, and to generate a second matrix of pixel data smaller than the first matrix by combining pixels in each of the plurality of sub-matrices in a predetermined manner to scale down the image, said combination of pixels excluding said center pixel of each sub-matrix.

2. The image processing device of claim 1, wherein the second matrix is generated by taking a median of the pixels in each sub-matrix.

3. The image processing device of claim 2, wherein each sub-matrix comprises three neighboring pixels of a center pixel of interest.

4. The image processing device of claim 3 wherein the first array includes nine pixels arranged in three rows and three columns and wherein each sub-array includes a different one of four corner pixels.

5. The image processing device of claim 4 wherein the second array includes four pixels arranged in two rows and two columns.

6. A scaling down processor for receiving a first plurality of pixels associated with image data, each of said first plurality of pixels having a gray-scale value associated therewith, said scaling processor comprising:
    (a) input means for receiving said first plurality of pixels and for arranging said received first plurality of pixels into a first matrix; and
    (b) processor means, coupled to said input means, for creating a second matrix by deleting a center pixel of said first matrix and thereafter for creating a second plurality of pixels, each of said second plurality of pixels having a gray-scale value defined by a median of said gray-scale values of said first plurality of pixels contained within said second matrix.

7. An image processing system comprising:
    an application specific integrated circuit, said integrated circuit providing first input means for receiving pixel data generated from an image sensor that scans a target and creates a scanned image thereof and provides corresponding image data in a first array of rows and columns, said circuit further including output means providing information about the locations of said pixel data within rows and columns of the scanned image, as well as said pixel data at outputs thereof; and
    a scaling processor coupled to the output means of said circuit and operative to create a plurality of sub-arrays from the first array of pixel data, each said sub-array being centered about a center pixel, and to generate a second array of pixel data smaller than the first array by combining pixels in each of the plurality of sub-arrays in a predetermined manner to scale down the image, said combination of pixels excluding said center pixel of each sub-array.

8. The system of claim 7 wherein said circuit further comprises:
    second input means for receiving end of scan line signals, each indicating an end of a scan line of said image sensor;
    memory means for storing the pixel data;
    address generator means for generating an address for each pixel in a scan line;
    counter means for identifying each of said end of scan line signals, regarding the placement of each of said pixels within said image data.

9. The image processing system of claim 7, wherein the second array is generating by taking a median of the pixels in each sub-array.

10. The image processing system of claim 9, wherein each sub-array comprises three neighboring pixels of a center pixel of interest.

11. The image processing system of claim 10 wherein the first array includes nine pixels arranged in three rows and three columns and wherein each sub-array includes a different one of four corner pixels.

12. The image processing system of claim 11 wherein the second array includes four pixels arranged in two rows and two columns.

13. A method of scaling down image data corresponding to a captured image, said method comprising:
    generating a first array of rows and columns of pixel data centered about a center pixel;
    generating a plurality of sub-arrays from the first array, each sub-array excluding the center pixel; and
    generating a second array smaller than the first array by combining pixels in each of the plurality of sub-arrays in a predetermined manner to scale down the captured image.

14. The method of claim 13, wherein the second array is generated by taking a median of the pixels in each sub-array.

15. The method of claim 14, wherein each sub-array comprises three pixels adjacent the center pixel.

16. The method of claim 15 wherein the first array includes nine pixels arranged in three rows and three columns and wherein the three pixels in each sub-array are neighboring.

17. The method of claim 16 wherein each sub-array includes a different one of four corner pixels.

18. The method of claim 17 wherein the second array includes four pixels arranged in two rows and two columns.

* * * * *